(12) United States Patent
Zhang et al.

(10) Patent No.: US 6,901,180 B2
(45) Date of Patent: May 31, 2005

(54) MEMS OPTICAL SWITCH ON A SINGLE CHIP AND METHOD

(75) Inventors: Nan Zhang, Chanhassen, MN (US); Hong Zhang, St. Paul, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/768,723

(22) Filed: Jan. 24, 2001

(65) Prior Publication Data

US 2002/0097950 A1 Jul. 25, 2002

(51) Int. Cl.[7] .................................................. G02B 6/26
(52) U.S. Cl. .......................... 385/18; 385/15; 385/16; 385/17; 385/19; 385/20; 385/21; 385/22; 385/23; 385/24
(58) Field of Search ............................... 385/18, 16, 17, 385/19, 15, 25, 21, 22, 23, 20, 24

(56) References Cited

U.S. PATENT DOCUMENTS

| 5,208,880 A | 5/1993 | Riza et al. |
| 5,774,604 A | 6/1998 | McDonald |
| 5,867,617 A | 2/1999 | Pan et al. |
| 5,923,798 A | * 7/1999 | Aksyuk et al. ................ 385/19 |
| 6,134,207 A | * 10/2000 | Jerman et al. ......... 369/112.29 |

FOREIGN PATENT DOCUMENTS

| DE | 196 43 443 A1 | 4/1998 |
| EP | 0 935 149 A2 | 8/1999 |
| EP | 1 089 108 A2 | 4/2001 |
| FR | 2 608 784 | 6/1988 |
| WO | WO 89/02064 | 3/1989 |
| WO | WO 99/37013 | 7/1999 |
| WO | WO 00/73841 A1 | 12/2000 |
| WO | WO 02/21191 A1 | 3/2002 |

* cited by examiner

Primary Examiner—Tarifur R. Chowdhury
Assistant Examiner—George Y. Wang
(74) Attorney, Agent, or Firm—Merchant & Gould P.C.

(57) ABSTRACT

The present invention provides for a 1×N optical switch having a switching component, an input, and a plurality of outputs formed in a single substrate. The switching component includes a pair of mirrors which are operated such that by changing the position of at least one of the mirrors, the output of the switch changes.

25 Claims, 20 Drawing Sheets

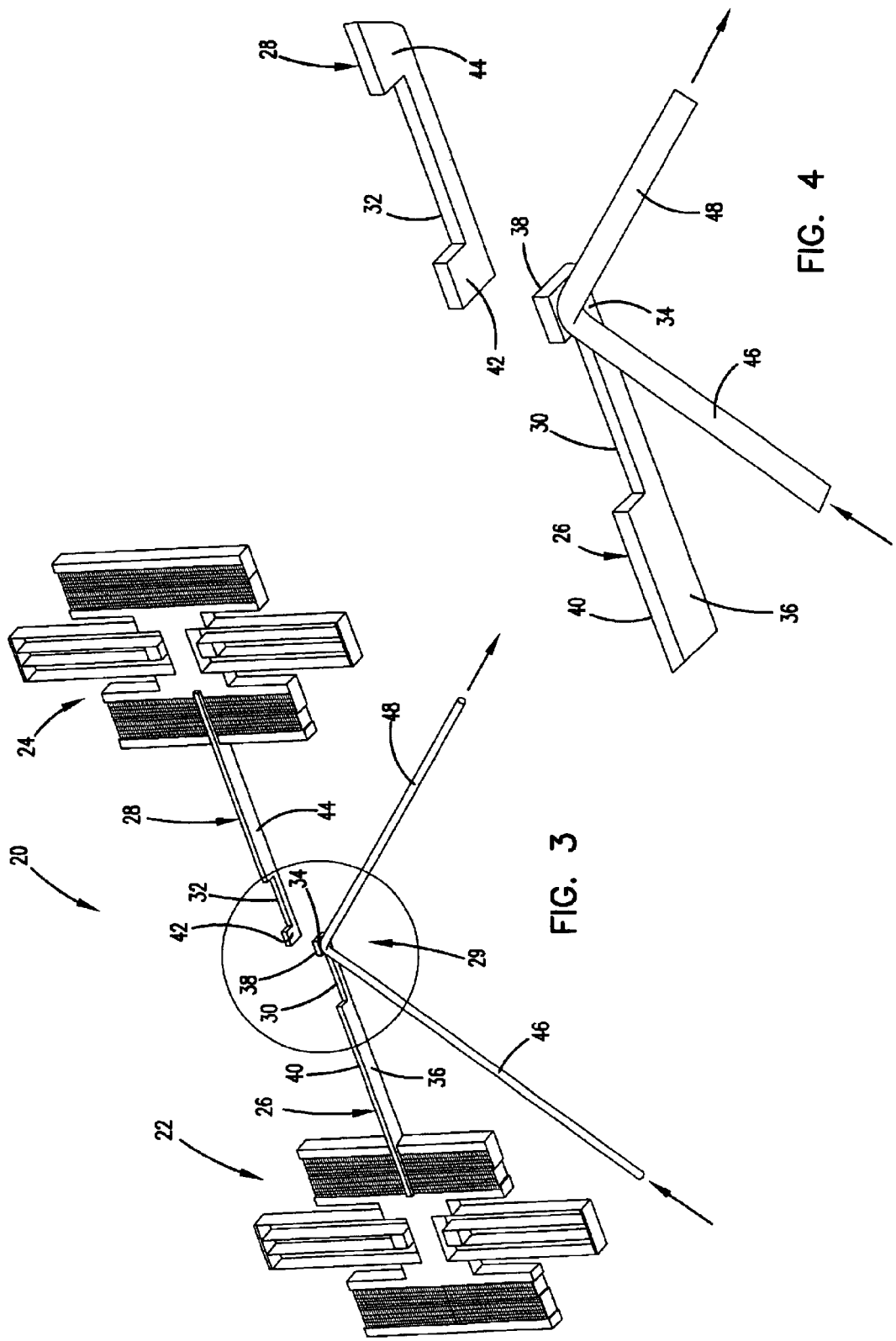

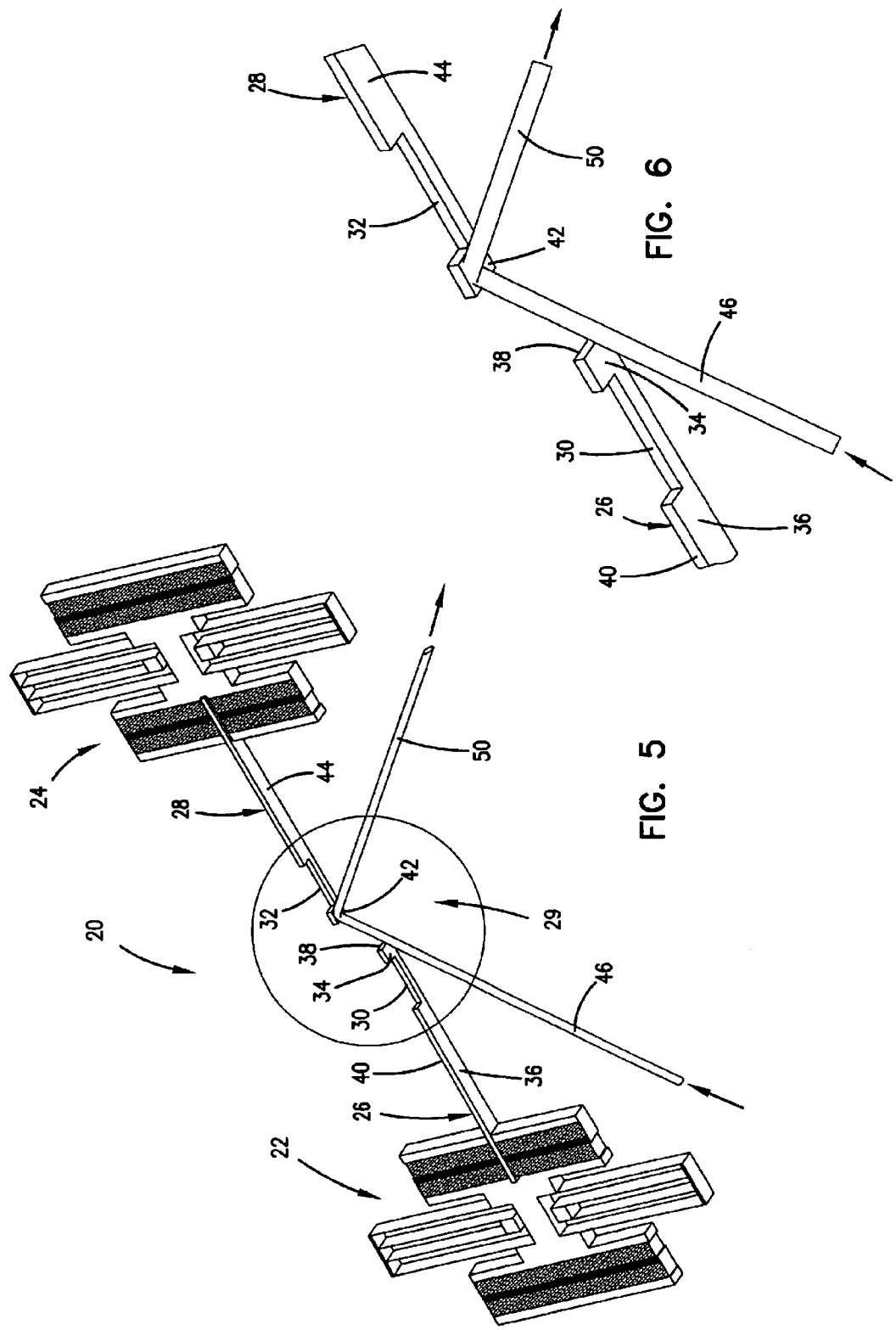

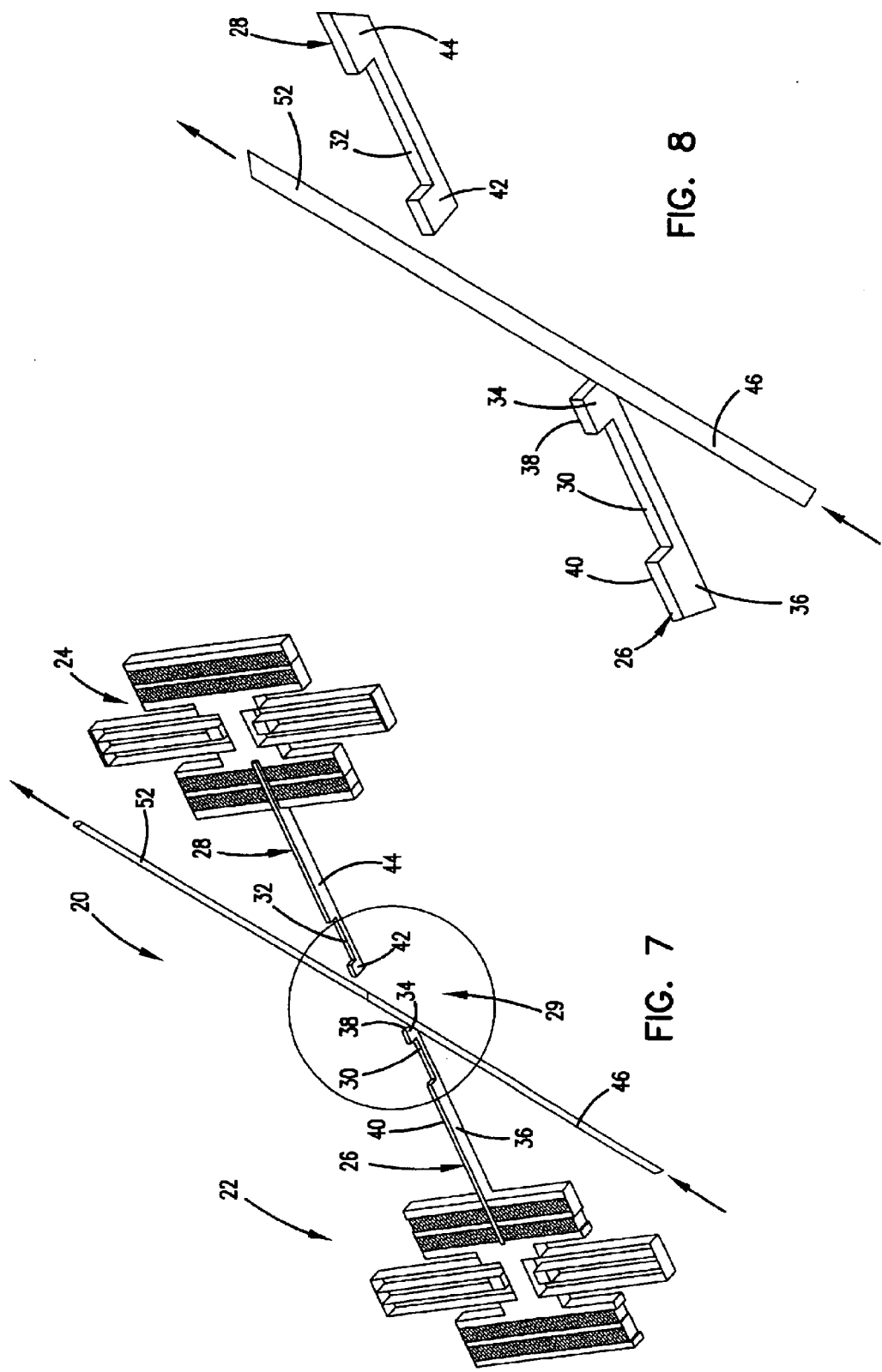

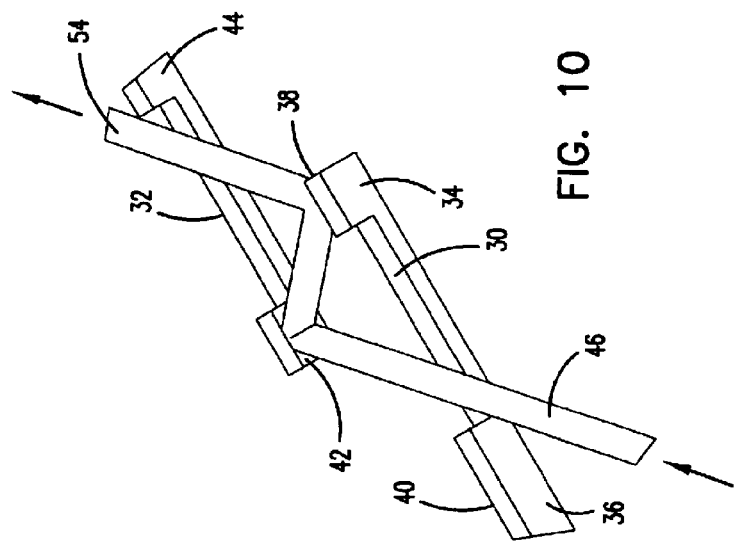
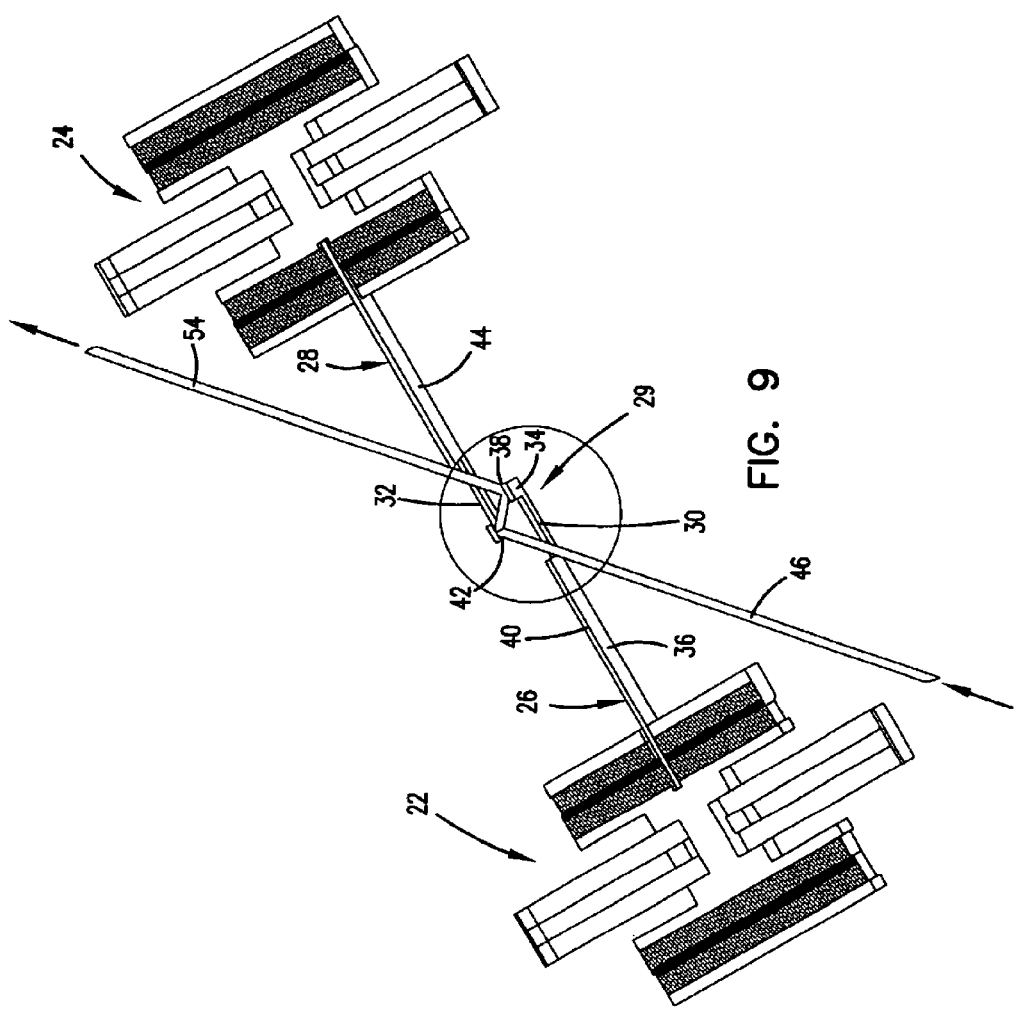

MEMS OPTICAL SWITCH ON A SINGLE CHIP AND METHOD

FIELD OF THE INVENTION

The present invention relates to optical switches and, more particularly, to microelectromechanical optical switches and methods of switching such optical switches.

BACKGROUND OF THE INVENTION

Modern technology has enabled microelectromechanical systems (MEMS) to be fabricated on semiconductor substrates, typically silicon substrates. These MEMS typically have sizes in the order of microns and may be integrated with other electrical circuits on a common substrate. As a result, MEMS have found their way into numerous applications across numerous industries. Exemplary MEMS applications include optical switching, inertial or pressure sensors, and biomedical devices.

MEMS optical switches are used in a variety of applications such as switching light waves between optical waveguides, such as fiber optical waveguides. MEMS optical switches are operable in a plane of a substrate or normal to the substrate. An example of an in-plane optical switch using a vertical mirror is disclosed in C. Marxer et al., "Vertical Mirrors Fabricated By Reactive Ion Etching For Fiber Optical Switching Applications," Proceedings IEEE, The Tenth Annual International Workshop on Micro Electro Mechanical Systems, An Investigation of Micro Structures, Sensors, Actuators, Machines and Robots (Cat. No. 97CH46021), IEEE 1997, pp. 49–54. The Marxer optical switch includes a metal coated silicon mirror coupled to a dual comb drive actuator. The dual comb actuators work in opposite directions to push the mirror into an optical path between optical fibers and to pull the mirror out of the optical path. The Marxer optical switch is fabricated in a single step using inductively coupled plasma etching technology with a sidewall passivation technique.

Various changes have been made in the design of in-plane optical switches using a vertical mirror. One of the changes is the use of a single comb drive actuator, an example of which is disclosed in U.S. patent application, Ser. No. 09/372,265, filed Aug. 11, 1999, entitled "MICROELECTROMECHANICAL OPTICAL SWITCH AND METHOD OF MANUFACTURE THEREOF", commonly assigned to ADC Telecommunications, Inc., which is incorporated herewith by reference.

With the existing MEMS optical switch technology, the switch that can be formed on a single substrate is a 1×2 optical switch as shown in FIG. 1A. In a 1×2 switch, an input beam is split into two output beams. If an 1×4 optical switch is to be constructed using the existing technology, three 1×2 optical switches are typically cascaded together as shown in FIG. 1B. The cascaded optical switches are coupled to one another by fibers. In general, insertion or coupling losses are associated with fiber couplings. Further, alignment between the fibers can be problematic, which often causes additional insertion or coupling losses. Furthermore, each 1×2 optical switch is typically packaged in a separate package as it is difficult to package several 1×2 optical switches into a single package. As a result, a typical 1×4 optical switch is less compact and involves complicated connections/couplings among the cascaded 1×2 optical switches.

Therefore, improvements on switching efficiency and compactness in fabrication and packaging of optical switches are desired.

SUMMARY OF THE INVENTION

One aspect of the present invention relates to an optical switch formed in a single substrate. The switch has an input and a plurality of outputs and includes a first actuator and a second actuator. The first actuator has a first mirror coupled thereto and moves the first mirror between at least one extended position and a retracted position. The second actuator has a second mirror coupled thereto and moves the second mirror between at least one extended position and a retracted position. The first mirror and the second mirror are disposed parallel to each other and offset a distance from each other. By changing the position of at least one of the first and second mirrors, the output of the switch changes.

Another aspect of the present invention relates to a method of switching an optical switch. The method includes a step of providing first and second actuators having first and second mirrors coupled to the first and second actuators, respectively, the first and second mirrors being disposed parallel to each other and offset a distance from each other in an intersection zone, and the first and second mirrors being capable of reflecting and/or passing through an optical beam, depending on positions of the first and second mirrors, to form a plurality of optical outputs. The method further includes the steps of directing the optical beam to the intersection zone, and controlling the first and second actuators to position the first and second mirrors to reflect and/or pass the optical beam therethrough to form at least four optical outputs.

A further aspect of the present invention relates to an optical switch formed in a substrate. The switch includes a switching component having an input waveguide, and a plurality of output waveguides. The input waveguide has an input end and an output end, and the output end of the first waveguide is disposed at the switching component. The first output waveguide has an input end and an output end, and the input end of the first output waveguide is disposed at the switching component. The second output waveguide has an input end and an output end, and the input end of the second output waveguide is disposed at the switching component. The third output waveguide has an input end and an output end, and the input end of the third output waveguide is disposed at the switching component. The fourth output waveguide has an input end and an output end, and the input end of the fourth output waveguide is disposed at the switching component.

Additional aspect of the present invention is that the switching component is configurable to determine a path through the switching component to be taken by an optical beam which is input to the switching component by the input waveguide.

Yet one aspect of the present invention relates to an 1×4 MEMS optical switch formed on a single substrate. The optical switch includes a plurality of waveguide channels, first and second actuators having first and second mirrors coupled thereto, respectively. The first and second actuators are controlled to position the first and second mirrors in an intersection zone of the waveguide channels to reflect and/or pass an input optical beam to form at least four optical outputs.

One of the advantages of the present invention is that to build an 1×N optical switch, it eliminates the need for cascading several 1×2 optical switches which require an 1×N package plus several individual 1×2 packages. Accordingly, the present invention provides a compact, easy to package optical switch. Further, the optical switch of the present invention is capable of being formed on a single chip, thereby significantly simplifying the chip fabrication process.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 is a schematic view of a first embodiment of an exemplary 1×N MEMS optical switch being operated to switch an input optical beam, which is directed by an input waveguide, to a first output waveguide in accordance with the principles of the present invention.

FIG. 4 is an enlarged view of a first mirror reflecting the input optical beam as shown in FIG. 3.

FIG. 5 is a schematic view of the optical switch of FIG. 3 being operated to switch the input optical beam, which is directed by the input waveguide, to a second output waveguide in accordance with the principles of the present invention.

FIG. 6 is an enlarged view of a second mirror reflecting the input optical beam as shown in FIG. 5.

FIG. 7 is a schematic view of the optical switch of FIG. 3 being operated to switch the input optical beam, which is directed by the input waveguide, to a third output waveguide in accordance with the principles of the present invention.

FIG. 8 is an enlarged view of the input optical beam passing through the first and second mirrors without being reflected by the first and second mirrors as shown in FIG. 7.

FIG. 9 is schematic view of the optical switch of FIG. 3 being operated to switch the input optical beam, which is directed by the input waveguide, to a fourth output waveguide in accordance with the principles of the present invention.

FIG. 10 is an enlarged view of the first and second mirrors reflecting the input optical beam as shown in FIG. 9.

DETAILED DESCRIPTION OF THE PREFERRED EMBODIMENT

The present invention provides for an 1×N MEMS optical switch having a switching component, an input, and a plurality of outputs formed in a single substrate. The switching component includes a pair of mirrors which are operated such that by changing the position of at least one of the mirrors, the output of the switch changes. As an example, an 1×4 optical switch is illustrated and described, however, the present invention is not limited to the preferred embodiments illustrated.

In the following description of the preferred embodiments, reference is made to the accompanying drawings, which form a part hereof, and in which is shown by way of illustration several embodiments in which the invention may be practiced. It is to be understood that other embodiments may be utilized as structural changes and may be made without departing from the spirit and scope of the present invention.

Figure 1A:
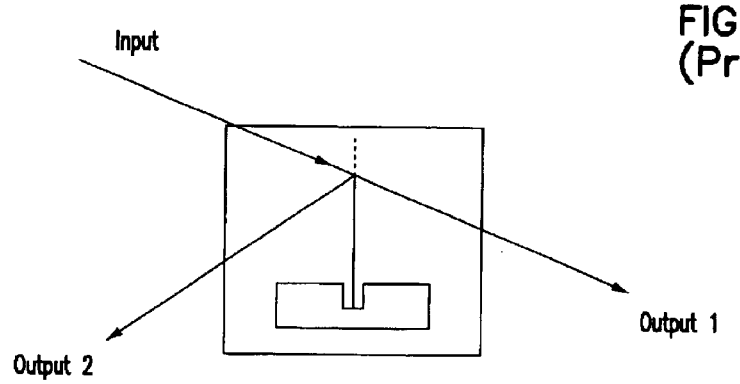
FIG. 1A is a schematic view of a typical 1×2 MEMS optical switch.
Figure 1B:
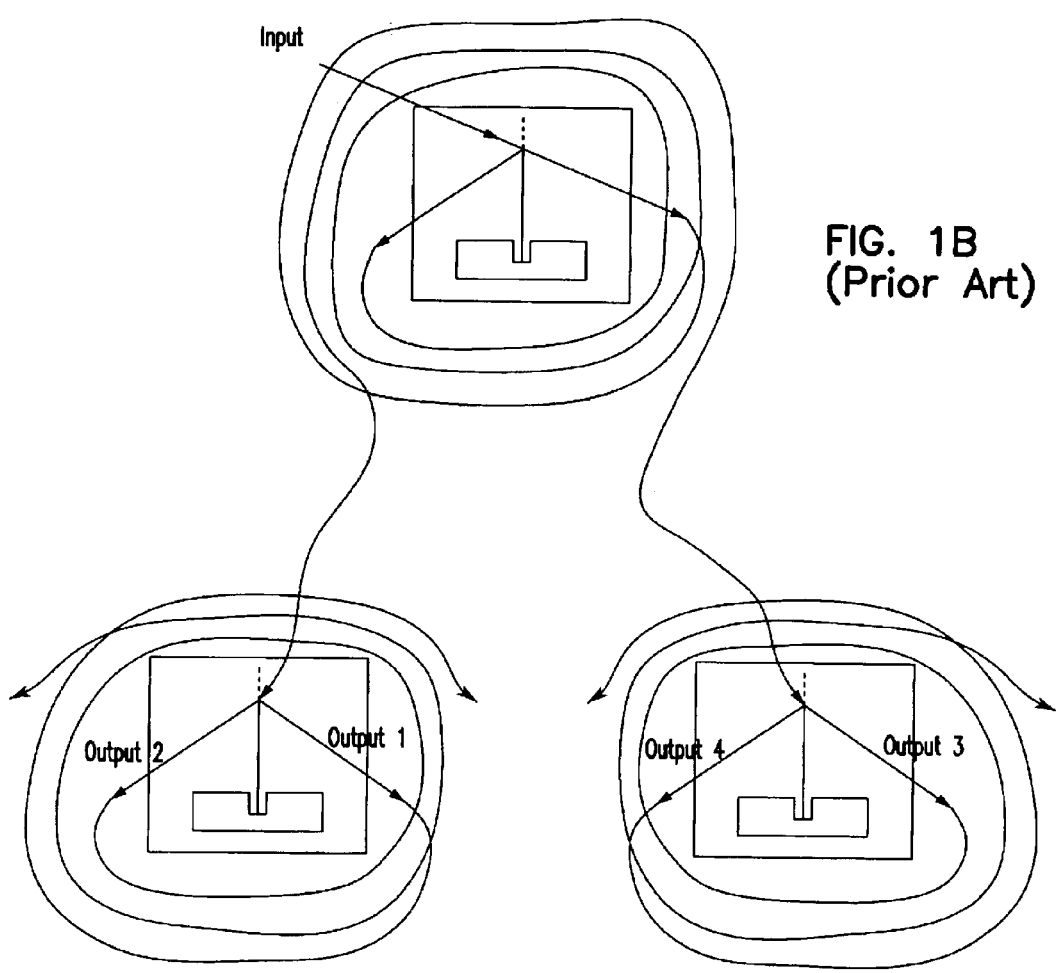
FIG. 1B is a schematic view of a typical 1×4 MEMS optical switch cascaded by three 1×2 optical switches.
Figure 2:
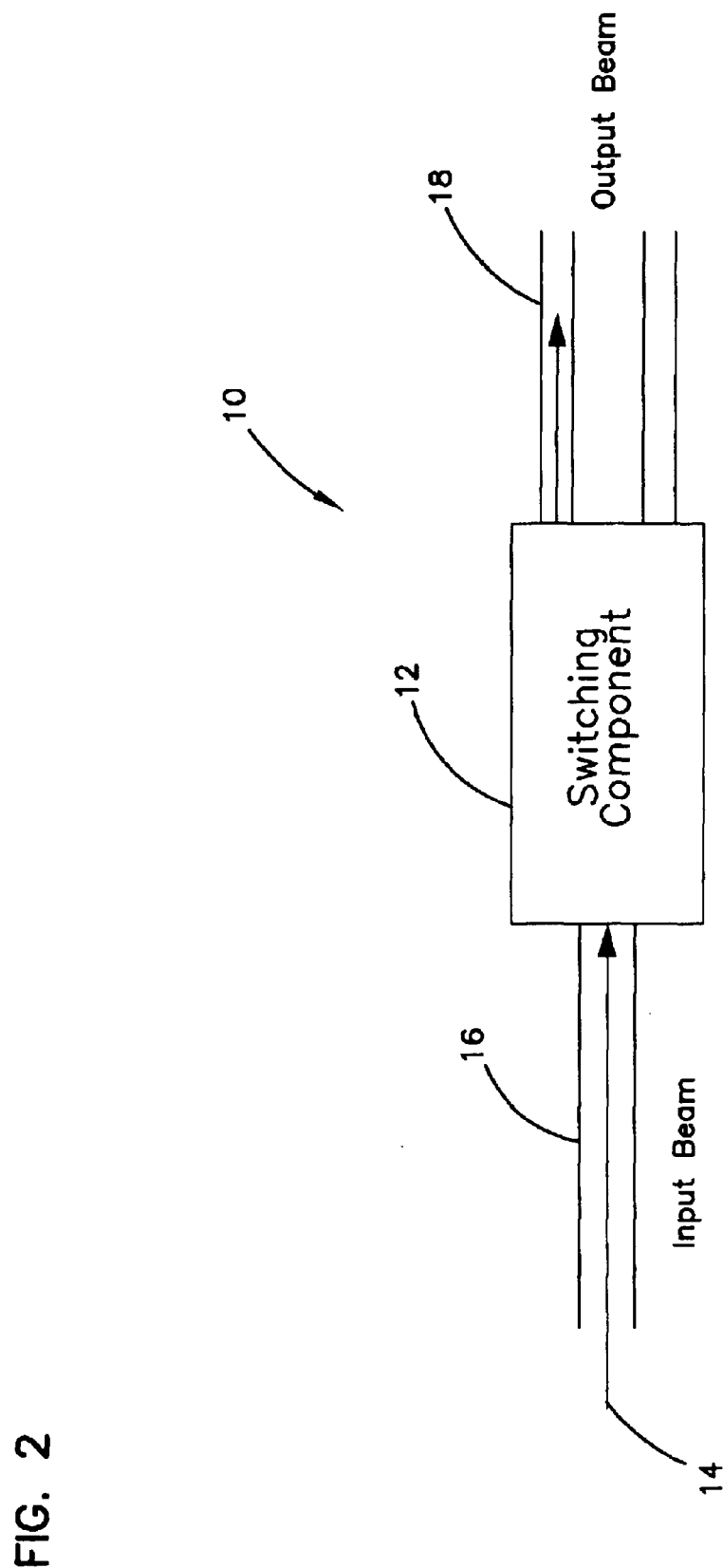
FIG. 2 is a block diagram of an 1×N MEMS optical switch being operated to switch an optical beam from an input to one of the outputs in accordance with the principles of the present invention.

Now referring to FIG. 2, an 1×N MEMS optical switch 10 includes a switching component 12. The switching component 12 is operated to switch an input optical beam 14, which is directed by an input channel 16, to one of the output channels 18.

In FIG. 3, an embodiment of an exemplary 1×4 MEMS optical switch 20 is illustrated. The optical switch 20 includes a switching component having a first actuator 22 and a second actuator 24. The first actuator 22 has a first mirror 26 coupled thereto. The term "mirror" herewith and hereinafter is referred to as a member having one or more reflecting sections. It is not necessary that the entire mirror is reflectable. In the preferred embodiments shown in the figures, not all of the mirror is reflectable. It is, however, appreciated that the entire mirror can be reflectable without departing from the scope of the invention.

The first actuator 22 moves the first mirror 26 between at least a first extended position, a second extended position, and a retracted position. The first extended position of the first mirror 26 is shown in FIG. 3, and the second extended position of the first mirror 26 is shown in FIG. 9. The retracted position of the first mirror 26 is shown in FIGS. 5 and 7.

The second actuator 24 has a second mirror 28 coupled thereto. The second actuator 24 moves the second mirror 28 between a first extended position, a second extended position, and a retracted position. The first extended position of the second mirror 28 is shown in FIGS. 3 and 5, and the second extended position of the second mirror 28 is shown in FIG. 9. The retracted position of the second mirror 28 is shown in FIG. 7.

The first and second mirrors 26, 28 are disposed in parallel to one another and offset a distance from each other in an intersection zone 29. By changing the position of at least one of the first and second mirrors 26, 28, the output of the switch 20 changes as will be described in detail hereinafter.

As shown in FIGS. 3, 5, 7, and 9, the first and second actuators 22, 24 are preferably double comb drive actuators capable of moving the first and second mirrors 26, 28 into their first extended position, second extended position, and retracted position. A double comb drive actuator is known in the art. It is appreciated that a single comb drive actuator can also be used without departing from the scope of the present invention. The examples of optical switches using a single comb drive actuator are shown in FIGS. 11, 12 and 18–24. A single comb drive actuator is capable of moving a mirror attached thereto into one extended position and one retracted position.

As shown in FIGS. 3–10, the first mirror 26 includes a notch 30, and the second mirror 28 includes a notch 32. As illustrated in FIGS. 9 and 10, the notch 30 is capable of letting an optical beam pass through the first mirror 26 without being reflected by the first mirror 26. Likewise, the notch 32 is capable of letting an optical beam pass through the second mirror 28 without being reflected by the second mirror 28. It is appreciated that other means of allowing an optical beam to pass through a mirror can be used within the scope of the present invention. For example, a window can be located on a mirror in an appropriate position, or a section of the mirror can be made of a certain material which allows the majority of an optical beam to pass therethrough.

The first mirror 26 has a reflecting section 34 disposed at a first side 36 proximate a tip end of the first mirror 26. The first mirror 26 also has a reflecting section 38 disposed at a second side 40 proximate the tip end of the first mirror 26. The second mirror 28 has a reflecting section 42 disposed at a first side 44 proximate a tip end of the second mirror 28. It is appreciated that a reflecting section can be disposed at other positions of the mirrors 26, 28 within the scope of the present invention.

Also shown in FIGS. 3–10 are an input waveguide 46 and a plurality of output waveguides 48, 50, 52, and 54. Each of the waveguides has an input end and an output end that allows an optical beam to be directed from the input end to the output end of the waveguide. The output end of the input waveguide 46 is disposed at the switching component of the optical switch 20 so that a beam is directed to the intersection zone 29. The input ends of the output waveguides 48, 50, 52, and 54 are disposed at the switching component of the optical switch 20. Accordingly, an optical beam which is directed by the input waveguide 46 is input to the switching component of the optical switch 20 where it is switched to one of the output waveguides 48, 50, 52, 54, and output by a particular output waveguide depending on the configuration of the switching component. The position of the mirrors 26, 28 determines which of the output waveguides 48, 50, 52, and 54 the input beam will be directed to.

In FIGS. 3 and 4, the first mirror 26 is disposed in its first extended position, and the second mirror 28 is disposed in its first extended position. An optical beam directed by the input waveguide 46 is reflected by the reflecting section 34 of the first mirror 26. The reflected optical beam is output from the switching component via the output waveguide 48.

In FIGS. 5 and 6, the first mirror 26 is disposed in its retracted position, and the second mirror 28 is disposed in its first extended position. The optical beam directed by the input waveguide 46 is reflected by the reflecting section 42 of the second mirror 28. The reflected optical beam is output from the switching component via the output waveguide 50.

In FIGS. 7 and 8, the first mirror 26 is disposed in its retracted position, and the second mirror 28 is disposed in its retracted position. The optical beam directed by the input waveguide 46 passes through the switching component without being reflected by either of the first and second mirrors 26, 28. The optical beam is output from the switching component via the output waveguide 52.

In FIGS. 9 and 10, the first mirror 26 is disposed in its second extended position, and the second mirror 28 is disposed in its second extended position. The optical beam directed by the input waveguide 46 passes through the notch 30 of the first mirror 26, is reflected by the reflecting section 42 of the second mirror 28 and the reflecting section 38 of the first mirror 26, and then passes through the notch 32 of the second mirror 28. The optical beam is output from the switching component via the output waveguide 54.

The switching component of the optical switch 20 is preferably formed in a single substrate, and the input and output waveguides of the optical switch 20 are preferably formed in a channel of the substrate. A method of forming a switching component and a channel for the waveguides in a substrate is disclosed in the U.S. patent application, Ser. No. 09/372,265, filed Aug. 11, 1999, entitled "MICROELECTRO-MECHANICAL OPTICAL SWITCH AND METHOD OF MANUFACTURE THEREOF", commonly assigned to ADC Telecommunications, Inc., which is incorporated herewith by reference.

Figure 11:
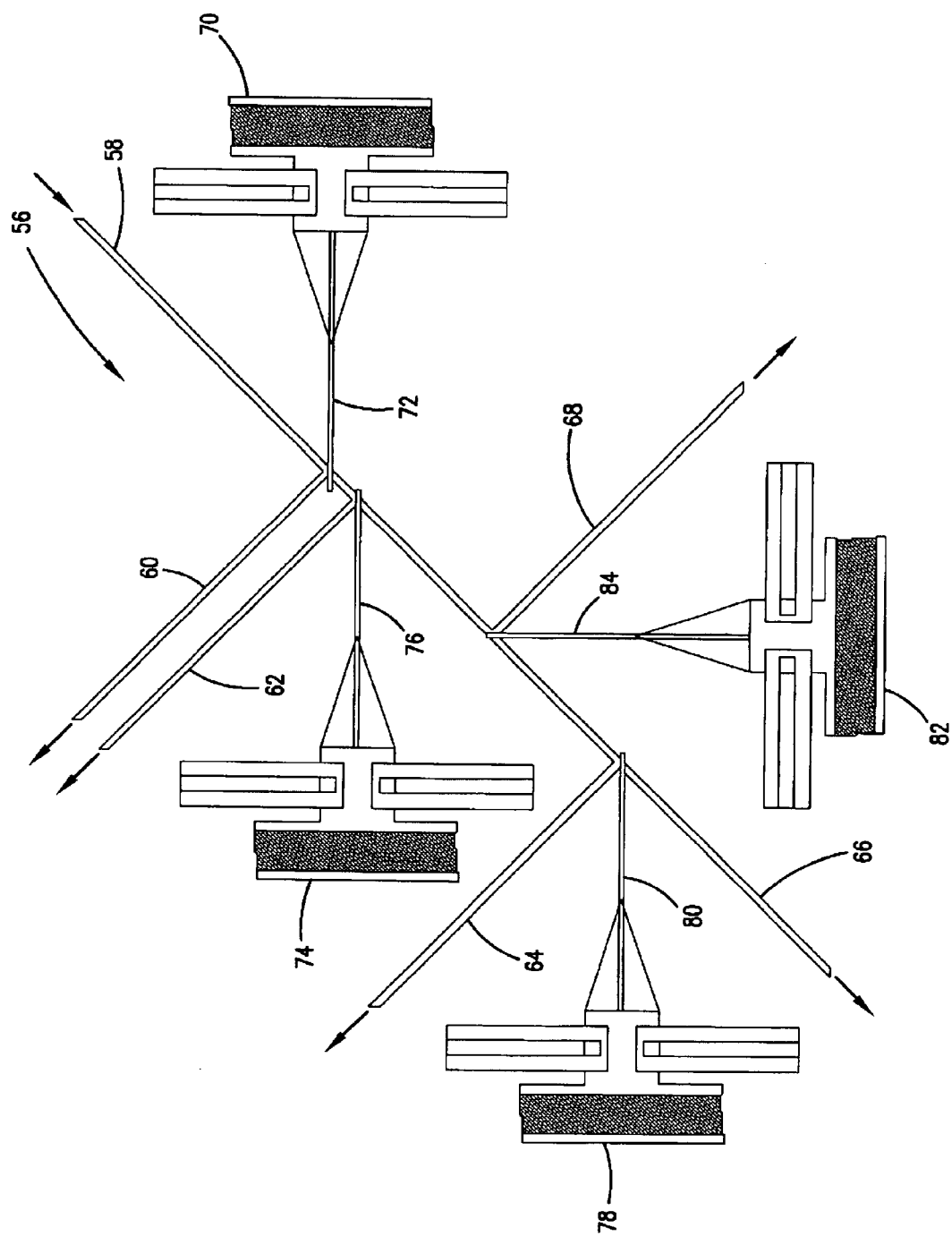
FIG. 11 is a schematic view of a second embodiment of an optical switch being operable to switch an input optical beam, which is directed by an input waveguide, to a plurality of output waveguides in accordance with the principles of the present invention.

It is appreciated that additional output waveguides can be formed in a single substrate to direct additional outputs from the switching component. For example, as shown in FIG. 11, a fifth output waveguide 68 directs an optical beam from the switching component. Such output can be referred to as "no output", "default output", or "opaque output" with respect to the other four outputs since there is no output at the other four outputs when the fifth output waveguide directs the optical beam from the switching component. It is appreciated that any one of the outputs can be designated as a "no output" without departing from the principles of the present invention.

FIG. 11 illustrates a second embodiment of an optical switch 56 being operable to switch an input optical beam directed by an input waveguide 58 to a plurality of output waveguides 60, 62, 64, 66, 68. A first actuator 70 moves a first mirror 72, attached thereto, into an extended position whereby the first mirror 72 reflects the input optical beam and directs the optical beam to the first output waveguide 60, and into a retracted position whereby the input optical beam passes by the first mirror 72. A second actuator 74 moves a second mirror 76, attached thereto, into an extended position whereby the second mirror 76 reflects the optical beam from the first mirror 72 and directs the optical beam to the second output waveguide 62, and into a retracted position whereby the optical beam from the first mirror 72 passes by the second mirror 76. A third actuator 78 moves a third mirror 80, attached thereto, into an extended position whereby the third mirror 80 reflects the optical beam from the second mirror 76 and directs the optical beam to the third output waveguide 64, and into a retracted position whereby the optical beam from the second mirror 76 passes by the third mirror 80 and directs the optical beam to the fourth output waveguide 66. A fourth actuator 82 moves a fourth mirror 84, attached thereto, into an extended position whereby the fourth mirror 84 reflects the optical beam from the second mirror 76 and directs the optical beam to the fifth output waveguide 68.

The mirrors 72, 76, 80, and 84 are similar to the mirrors described in the first embodiment except that the mirrors 72, 76, 80, and 84 do not include any notches or windows, etc., and that the reflecting sections of the mirrors are disposed on one side of the mirrors. It is appreciated that other types of mirrors can be used within the scope of the present invention.

Also, it is appreciated that the fourth mirror 84 can be extended into any other optical paths as long as no optical beam is output by the output waveguides 60, 62, 64, 66. For example, the fourth mirror 84 can be arranged to extend into an optical path along the output waveguide 66 whereby the fourth mirror 84 reflects the optical beam from the third mirror 80 and directs the optical beam to a corresponding fifth output waveguide. The fifth output waveguide can be designated for the "no output" waveguide as described above.

Figure 12:
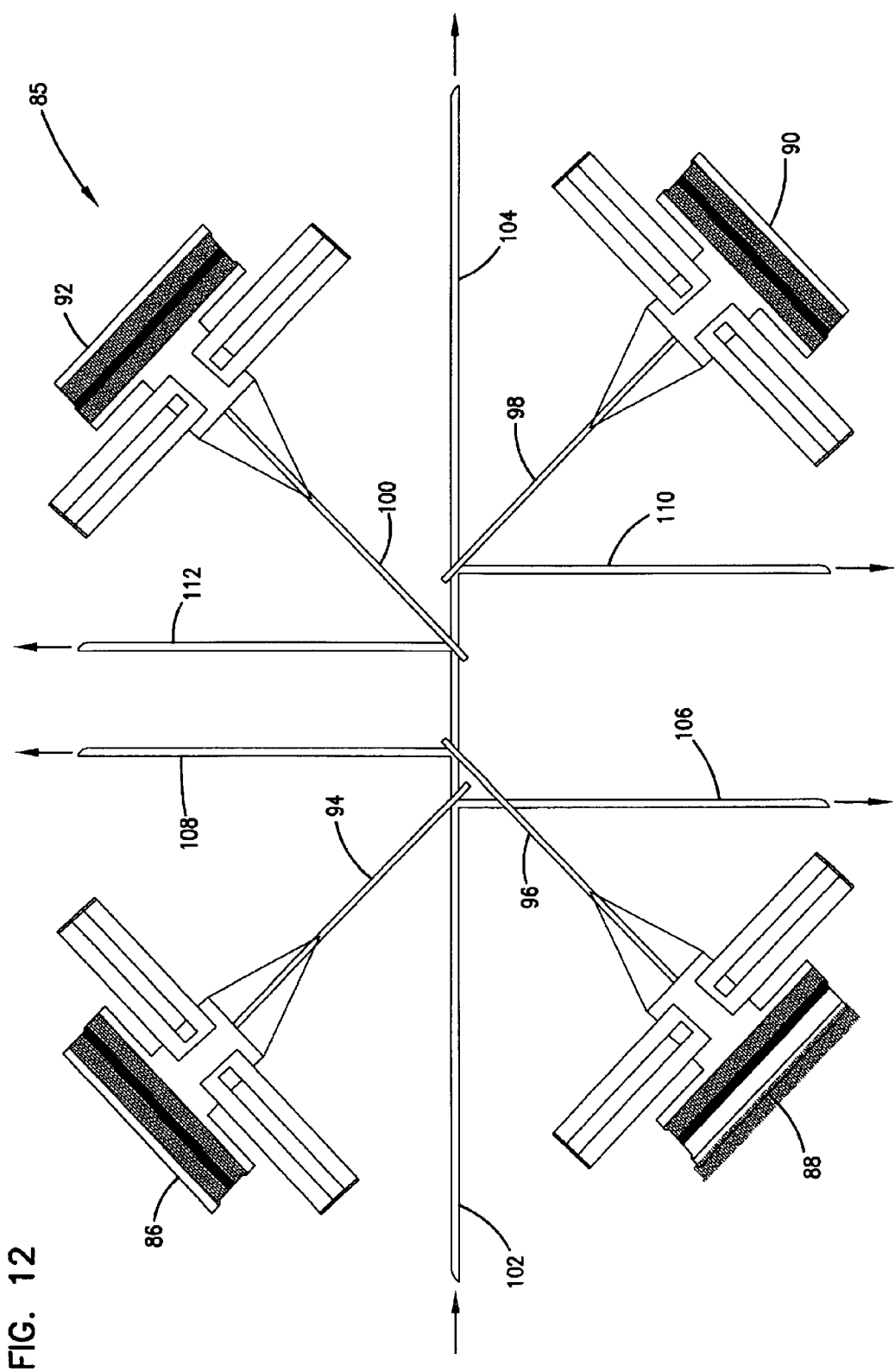
FIG. 12 is a schematic view of a third embodiment of an optical switch being operable to switch an input optical beam, which is directed by an input waveguide, to a plurality of output waveguides in accordance with the principles of the present invention.
Figure 13:
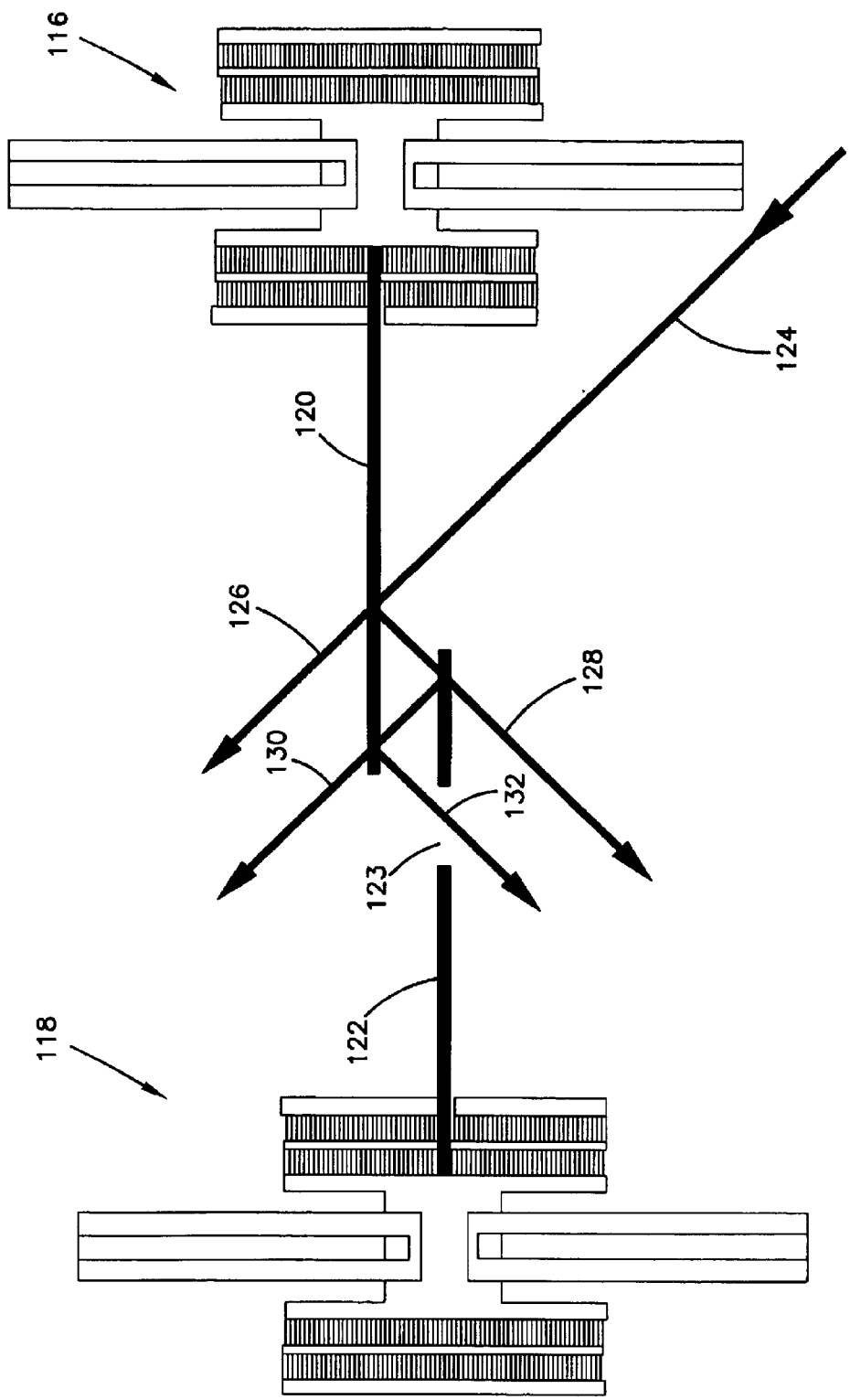
FIG. 13 is a schematic view of a fourth embodiment of an optical switch being operable to switch an input optical beam, which is directed by an input waveguide, to a plurality of output waveguides in accordance with the principles of the present invention.

FIG. 12 illustrates a third embodiment of an optical switch 85 being operable to switch an input optical beam directed by an input waveguide 102 to a plurality of output waveguides 104, 106, 108, 110, 112. The operations of actuators 86, 88, 90, 92 in controlling of mirrors 94, 96, 98, 100 are similar to the operations described in FIG. 11. The actuators 86, 88, 90, and 92 move the mirrors 94, 96, 98, and 100, respectively, into their extended position and retracted position. When the mirrors 94, 96, 98, and 100 are all in their retracted positions, an optical beam which is directed by the input waveguide 102 passes by all the mirrors 94, 96, 98, and 100 and is output by the output waveguide 104. When the first mirror 94 is in its extended position, the optical beam which is directed by the input waveguide 102 is reflected by the first mirror 94 and is output by the output waveguide 106. When the first mirror 94 is in its retracted position, and the second mirror 96 is in its extended position, the optical beam which is directed by the input waveguide 102 is reflected by the second mirror 96 and is output by the output waveguide 108. When the first and second mirrors 94, 96 are in their retracted positions, and the third mirror 98 is in its extended position, the optical beam which is directed by the input waveguide 102 is reflected by the third mirror 98 and is output by the output waveguide 110. When the first, second, and third mirrors 94, 96, 98 are in their retracted positions, and the fourth mirror 100 is in its extended position, the optical beam which is directed by the input waveguide 102 is reflected by the fourth mirror 100 and is output by the output waveguide 112. The output waveguide 110 is designated as "no output" waveguide as described above.

The mirrors 94, 96, 98, and 100 are preferably the same as the mirrors described in the second embodiment. It is appreciated that other types of mirrors can be used within the scope of the present invention.

FIGS. 13–17 illustrate a fourth embodiment of an optical switch 114 being operable to switch an input optical beam directed by an input waveguide 124 to a plurality of output waveguides 126, 128, 130, and 132. The operations of actuators 116, 118 in controlling of mirrors 120, 122 are similar to the operations described in FIGS. 3–10. The mirrors 120, 122 are similar to the mirrors described in the first embodiment except that the mirror 120 includes multiple reflecting sections, and the mirror 122 has a notch or window 123. It is appreciated that other types of mirrors can be used within the scope of the present invention.

Figure 14:
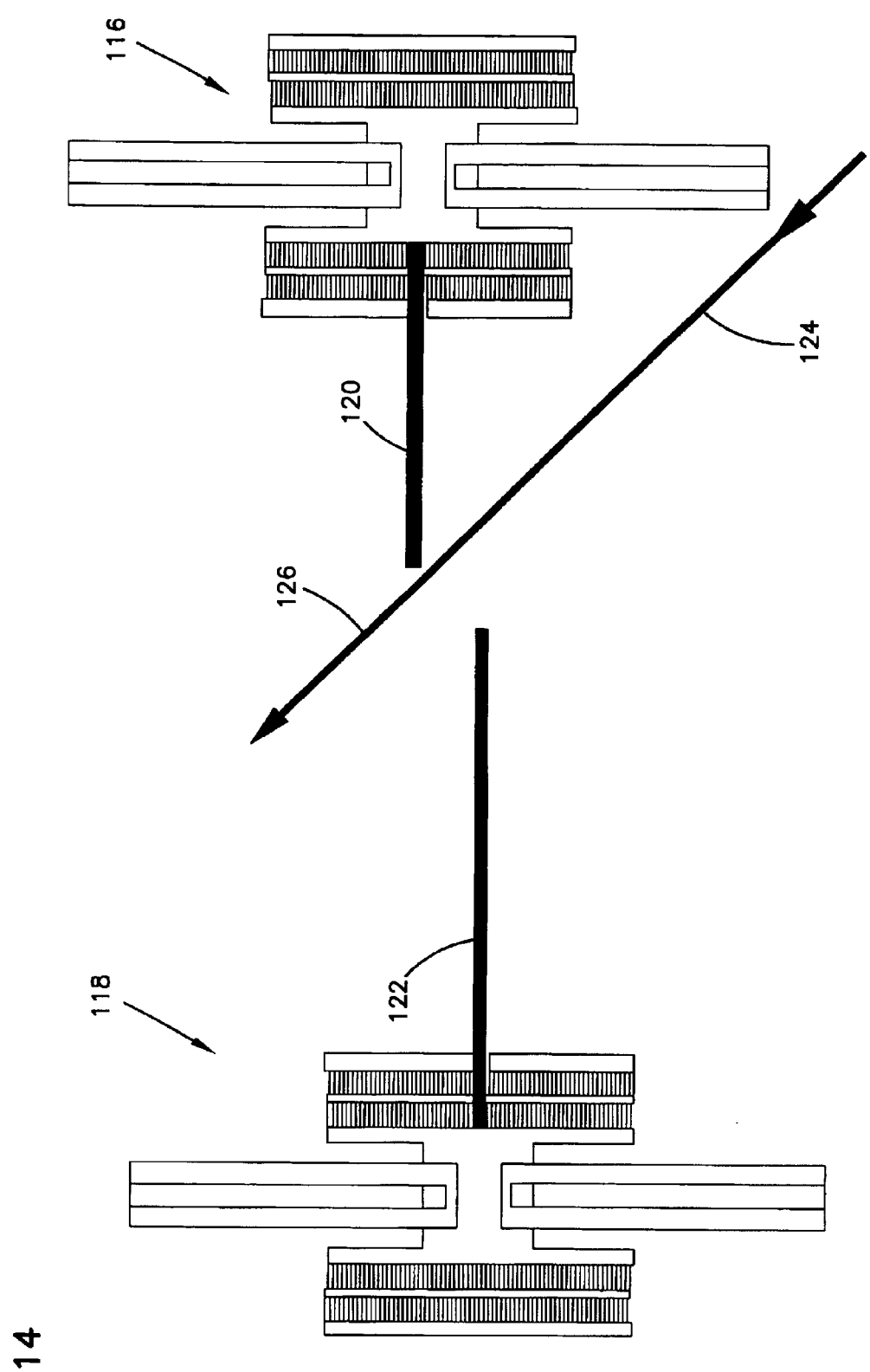
FIG. 14 is a schematic view of the optical switch of FIG. 13 being operated to switch the input optical beam, which is directed by the input waveguide, to a first output waveguide in accordance with the principles of the present invention.

In FIG. 14, the first and second mirrors 120, 122 are in their retracted positions whereby the input optical beam which is directed by the input waveguide 124 passes by the first and second mirrors 120, 122 without being reflected by the mirrors 120, 122 and is output by the output waveguide 126.

Figure 15:
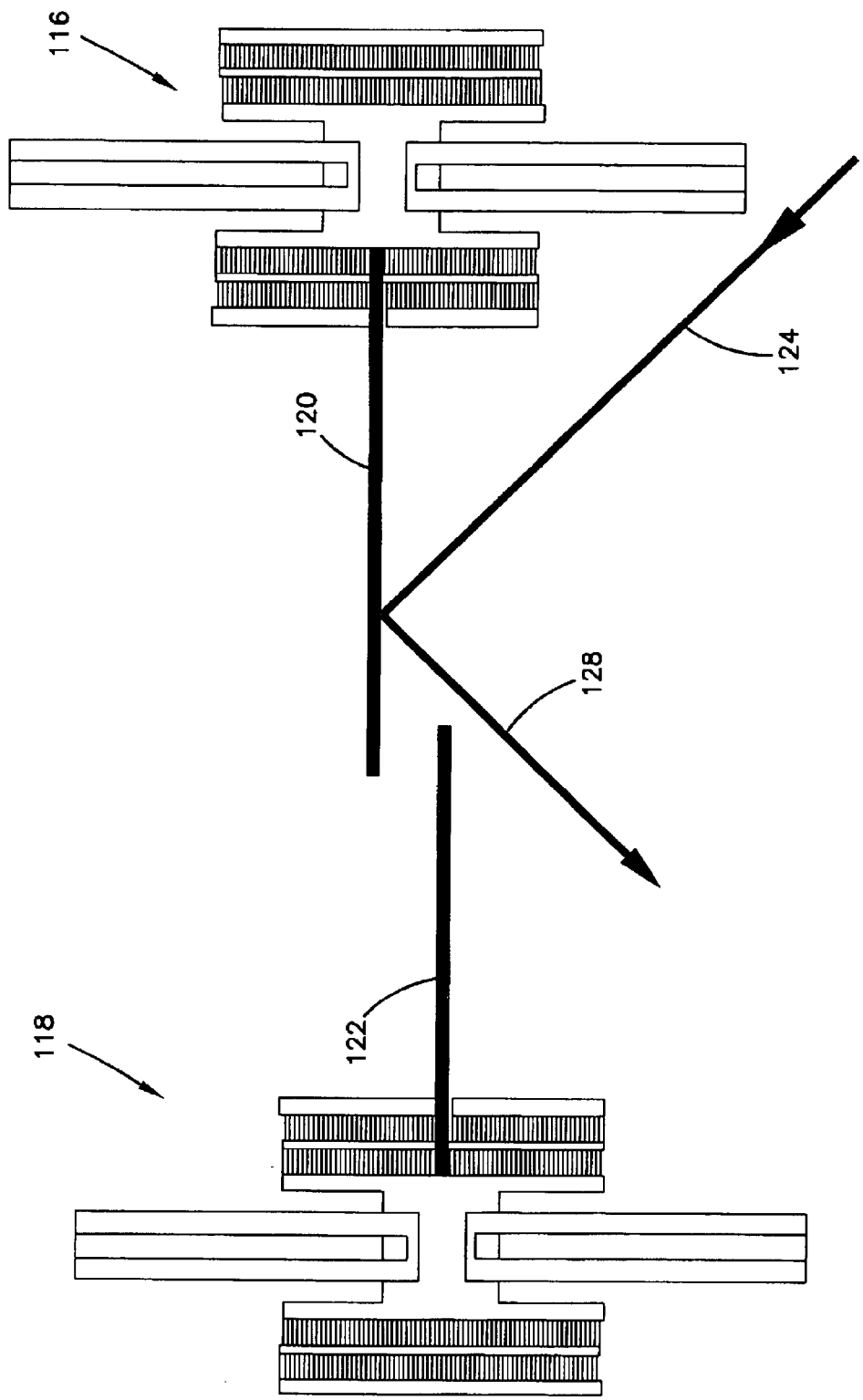
FIG. 15 is a schematic view of the optical switch of FIG. 13 being operated to switch the input optical beam, which is directed by the input waveguide, to a second output waveguide in accordance with the principles of the present invention.

In FIG. 15, the first mirror 120 is in a first extended position, and the second mirror 122 is in its retracted position. The input optical beam which is directed by the input waveguide 124 is reflected by the first mirror 120 and is output by the output waveguide 128.

Figure 16:
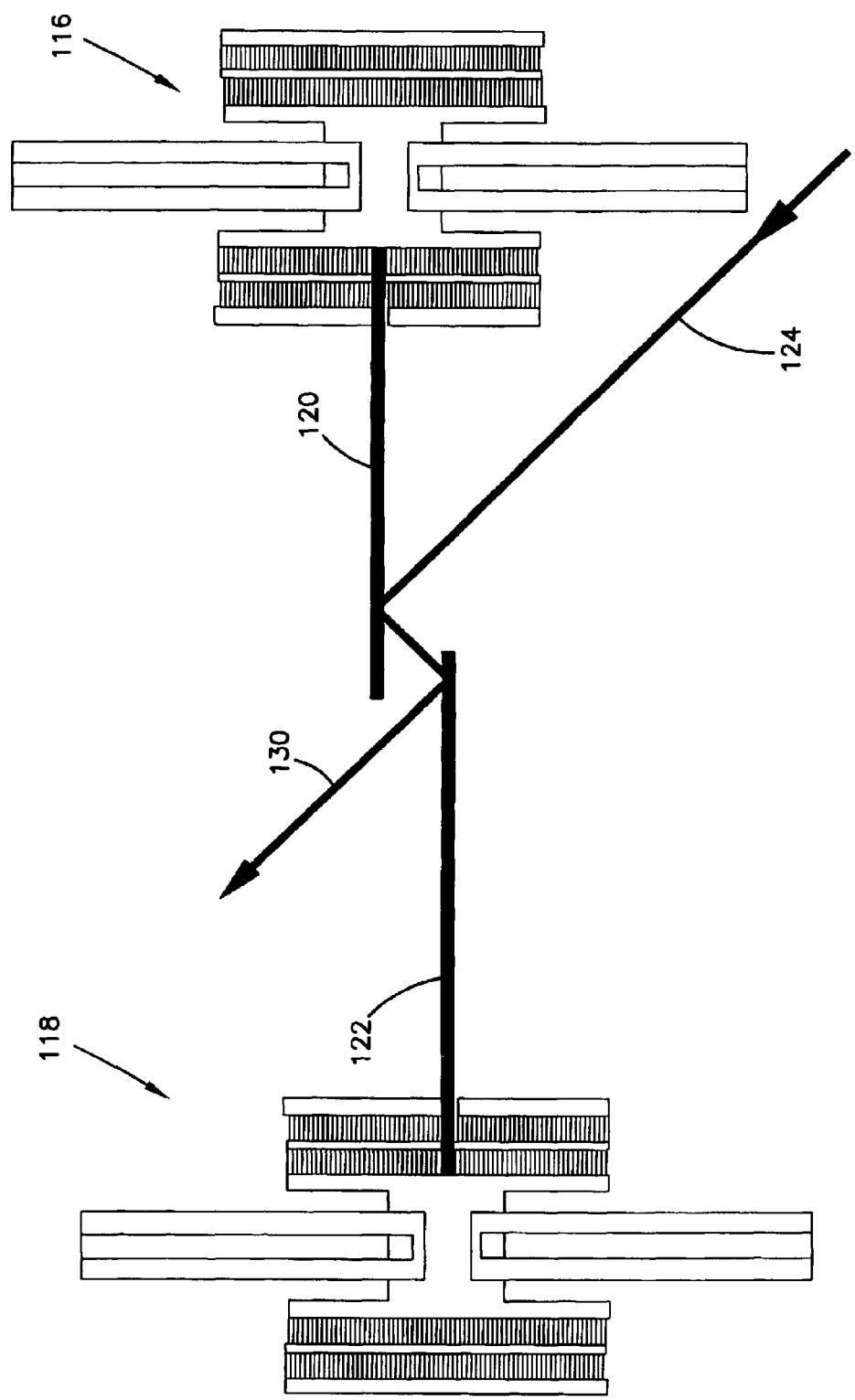
FIG. 16 is a schematic view of the optical switch of FIG. 13 being operated to switch the input optical beam, which is directed by the input waveguide, to a third output waveguide in accordance with the principles of the present invention.

In FIG. 16, the first mirror 120 is in a second extended position, and the second mirror 122 is in its extended position. The input optical beam which is directed by the input waveguide 124 is reflected by the first mirror 120, then the second mirror 122, and is output by the output waveguide 130.

Figure 17:
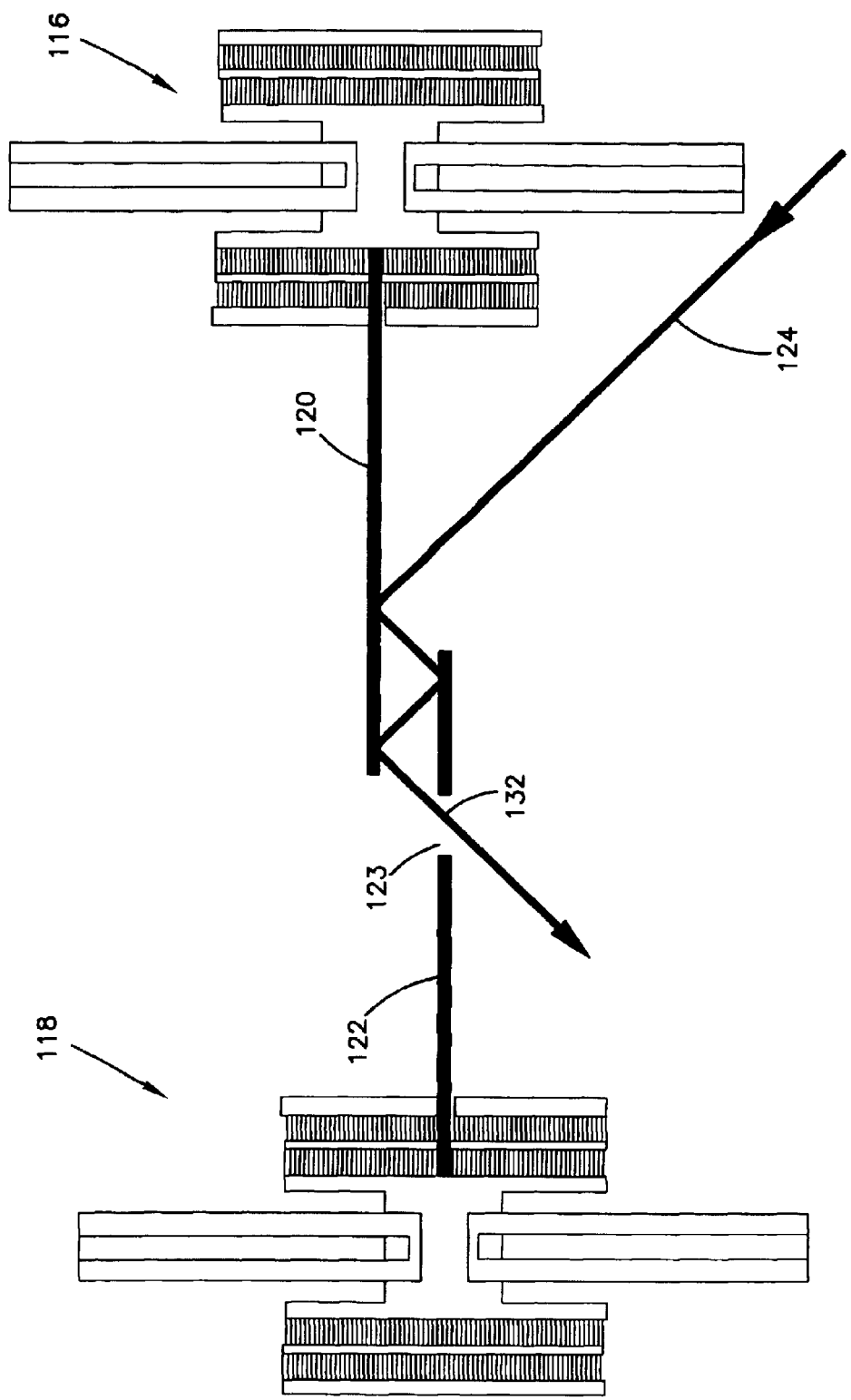
FIG. 17 is a schematic view of the optical switch of FIG. 13 being operated to switch the input optical beam, which is directed by the input waveguide, to a fourth output waveguide in accordance with the principles of the present invention.
Figure 18:
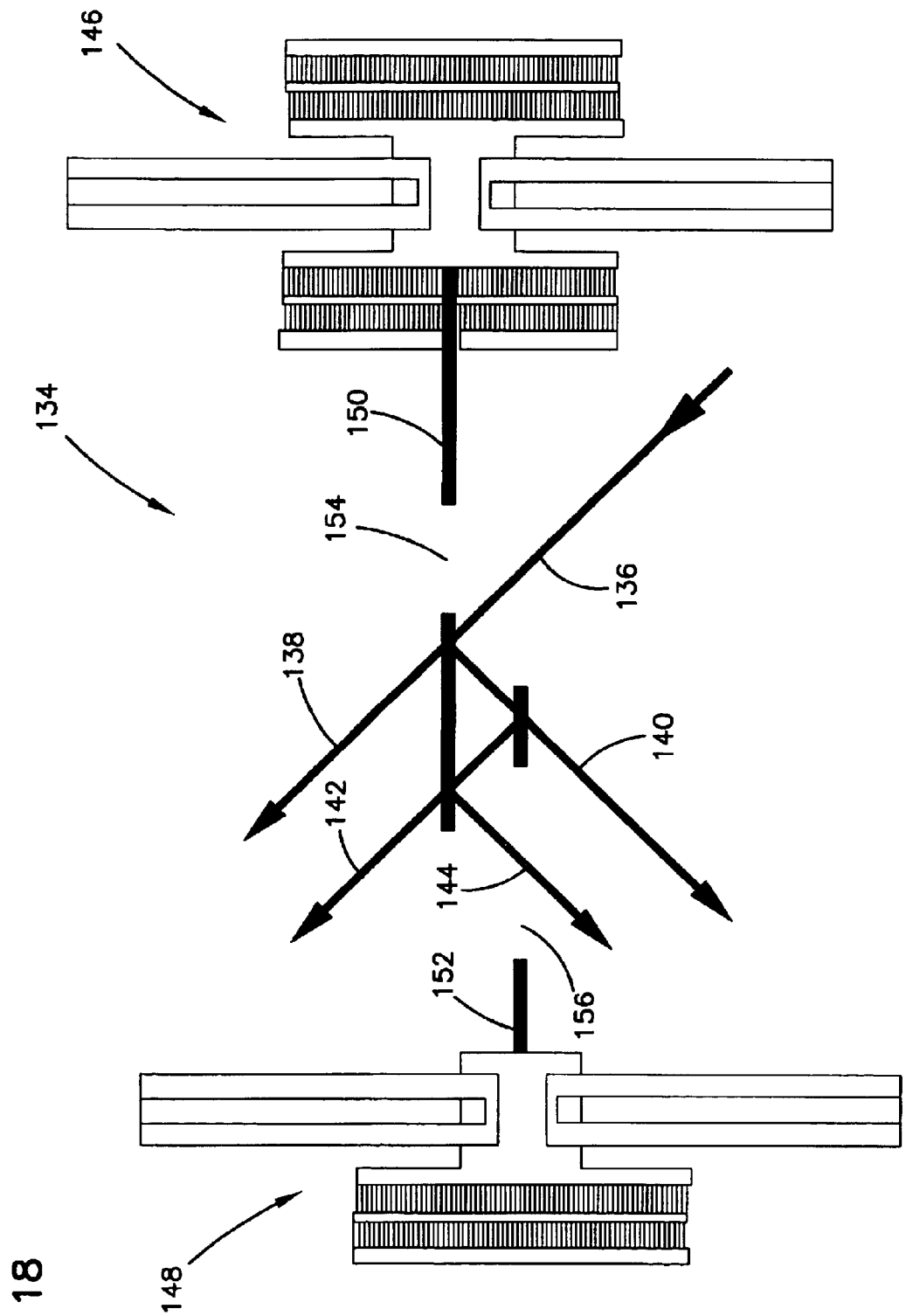
FIG. 18 is a schematic view of a fifth embodiment of an optical switch being operable to switch an input optical beam, which is directed by an input waveguide, to a plurality of output waveguides in accordance with the principles of the present invention.

In FIG. 17, the first mirror 120 is in its first extended position, and the second mirror 122 is in its extended position. The input optical beam which is directed by the input waveguide 124 is reflected by the first mirror 120, the second mirror 122, and the first mirror 120 again, passes through the notch or window 123 of the second mirror 122, and is output by the output waveguide 132.

FIGS. 18–22 illustrate a fifth embodiment of an optical switch 134 being operable to switch an input optical beam directed by an input waveguide 136 to a plurality of output waveguides 138, 140, 142, and 144. The operations of actuators 146, 148 in controlling of mirrors 150, 152 are similar to the operations described in FIGS. 13–17. As shown, the mirror 150 includes a window or notch 154 to let an optical beam pass through. The mirror 152 includes a window or notch 156 to let an optical beam pass through. The actuator 146 is a double comb drive actuator, and the actuator 148 is a single comb drive actuator. The mirrors 150, 152 are similar to the mirrors described in the first embodiment except that the mirror 150 includes multiple reflecting sections. It is appreciated that other types of mirrors can be used within the scope of the present invention.

Figure 19:
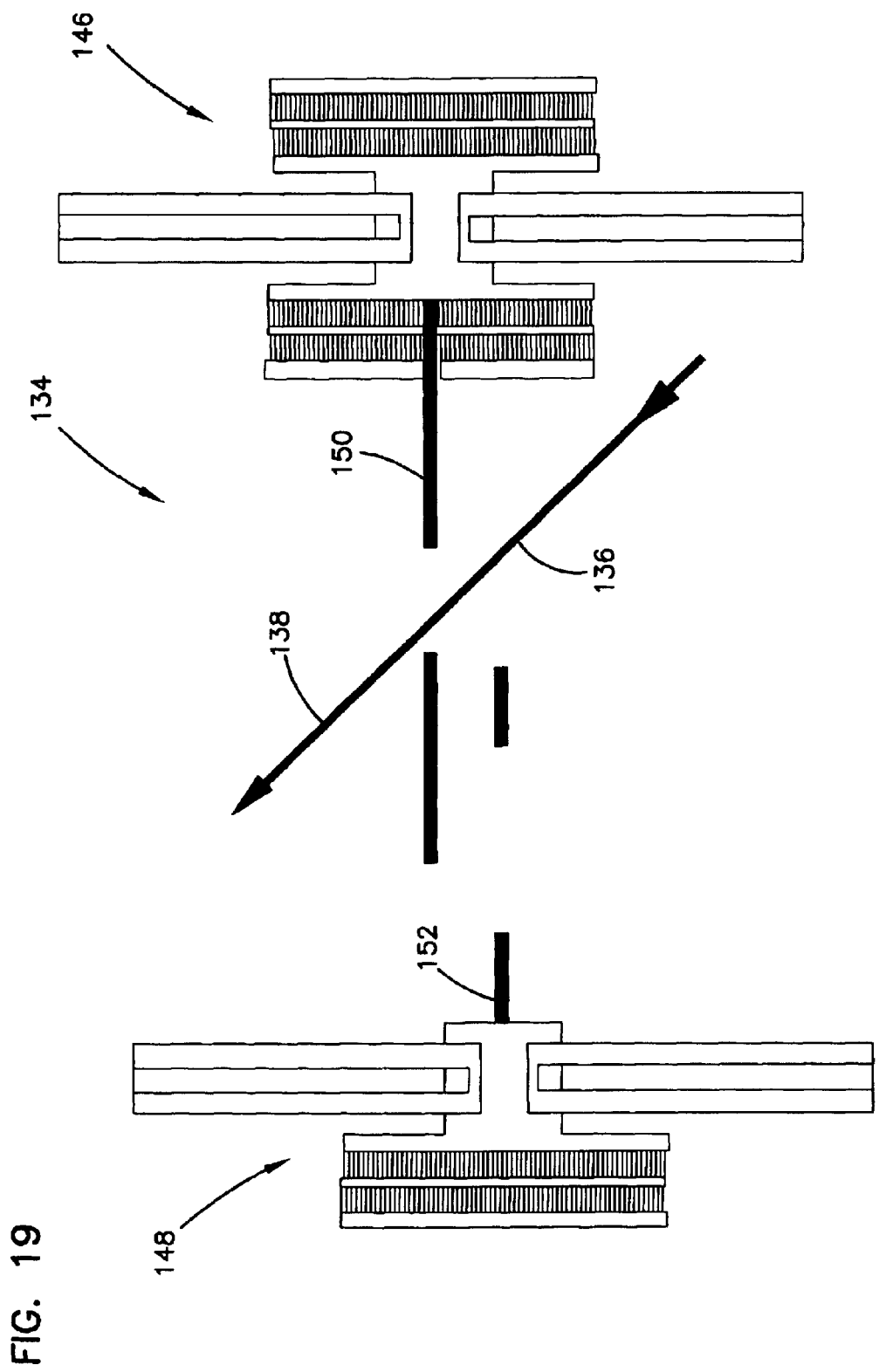
FIG. 19 is a schematic view of the optical switch of FIG. 18 being operated to switch the input optical beam, which is directed by the input waveguide, to a first output waveguide in accordance with the principles of the present invention.

In FIG. 19, the first mirror 150 is in its first extended position, and the second mirror 152 is in its retracted position. The input optical beam which is directed by the input waveguide 136 passes through the window 154 of the first mirror 150 without being reflected by the first and second mirrors 150, 152 and is output by the output waveguide 138.

Figure 20:
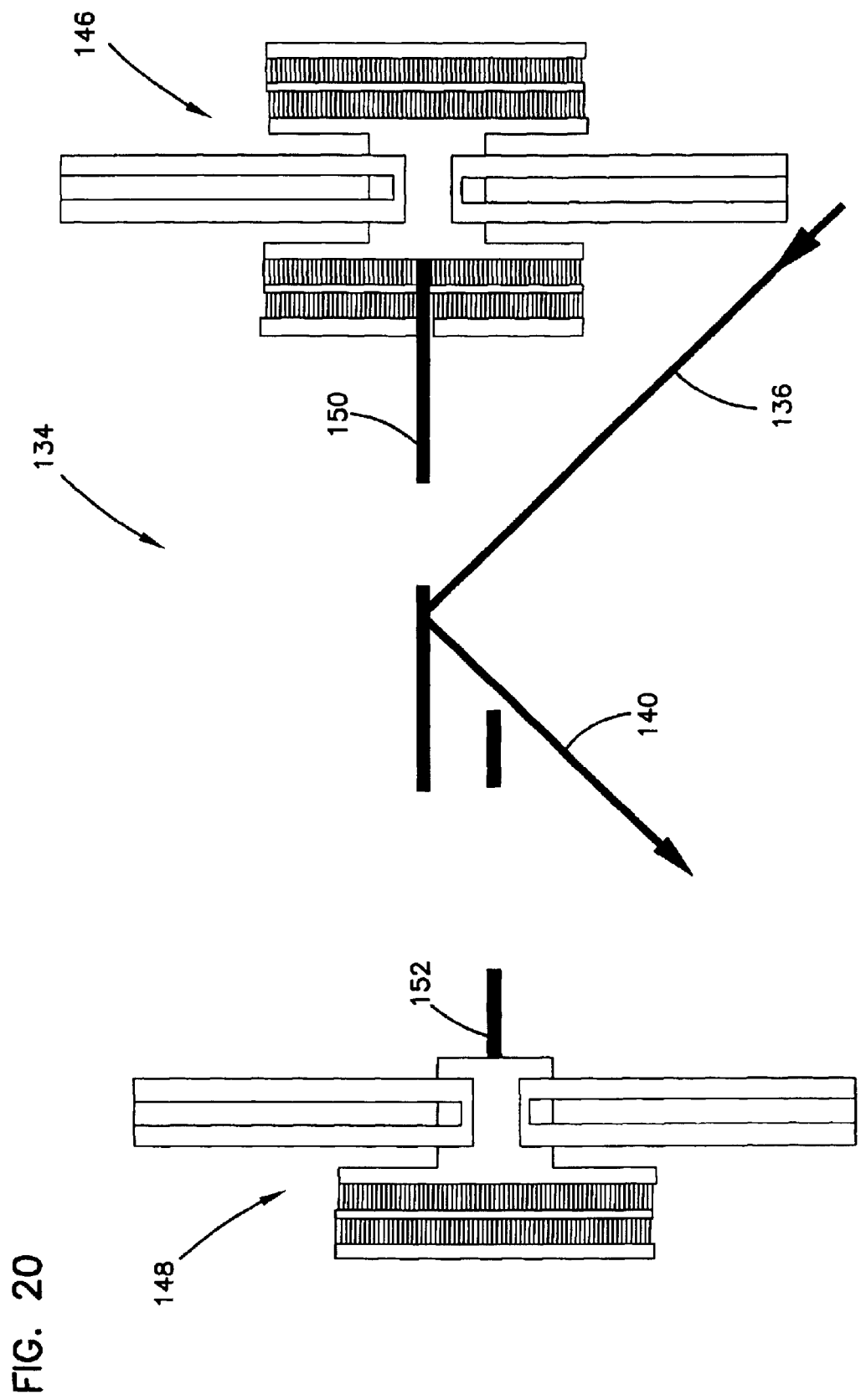
FIG. 20 is a schematic view of the optical switch of FIG. 18 being operated to switch the input optical beam, which is directed by the input waveguide, to a second output waveguide in accordance with the principles of the present invention.

In FIG. 20, the first mirror 150 is in its retracted position, and the second mirror 152 is in its retracted position. The input optical beam which is directed by the input waveguide 136 is reflected by the first mirror 150 and is output by the output waveguide 140.

Figure 21:
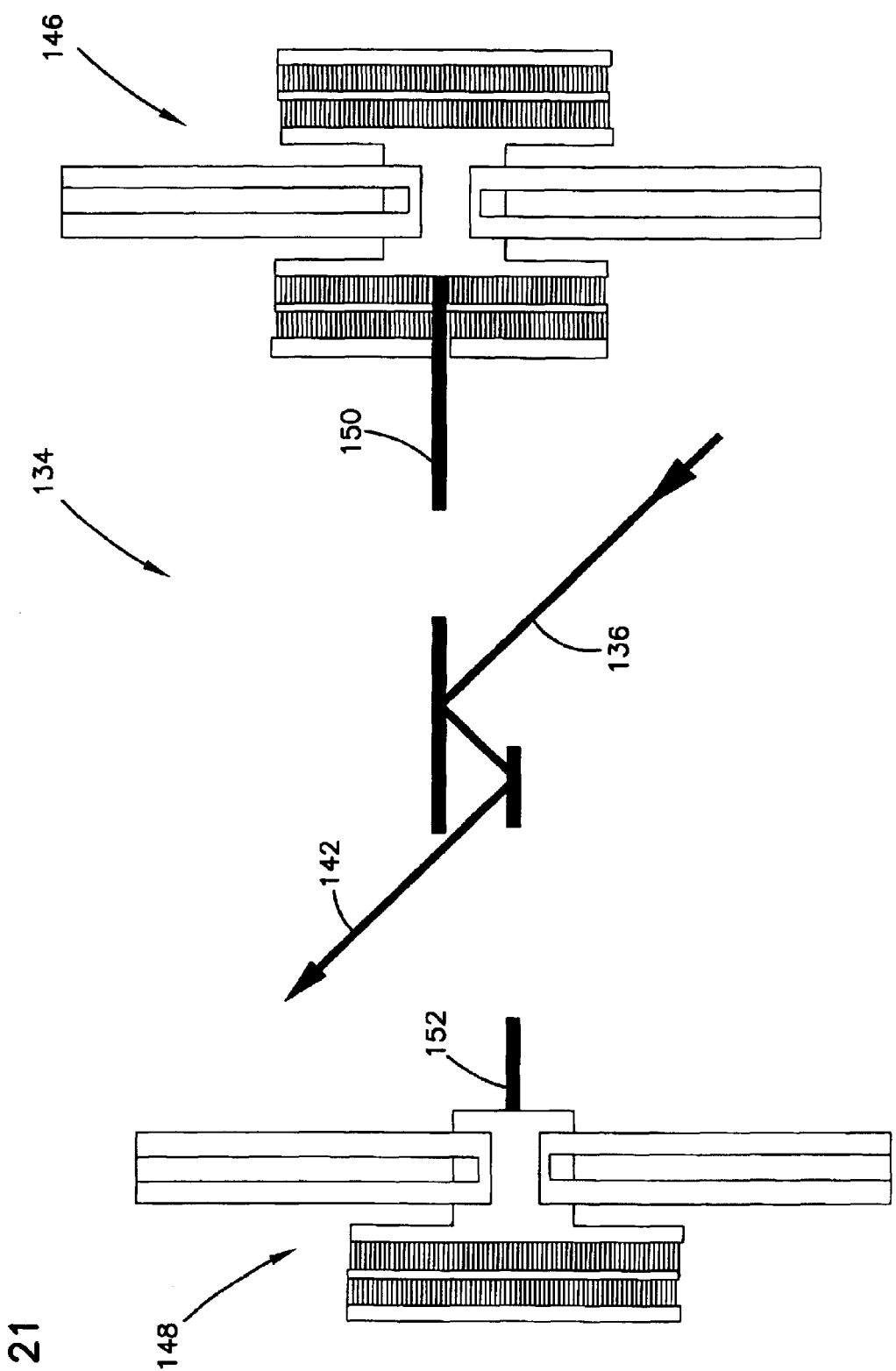
FIG. 21 is a schematic view of the optical switch of FIG. 18 being operated to switch the input optical beam, which is directed by the input waveguide, to a third output waveguide in accordance with the principles of the present invention.

In FIG. 21, the first mirror 150 is in a second extended position, and the second mirror 152 is in its extended position. The input optical beam which is directed by the input waveguide 136 is reflected by the first mirror 150, and the second mirror 152, then passes by the first mirror 150, and is output by the output waveguide 142.

Figure 22:
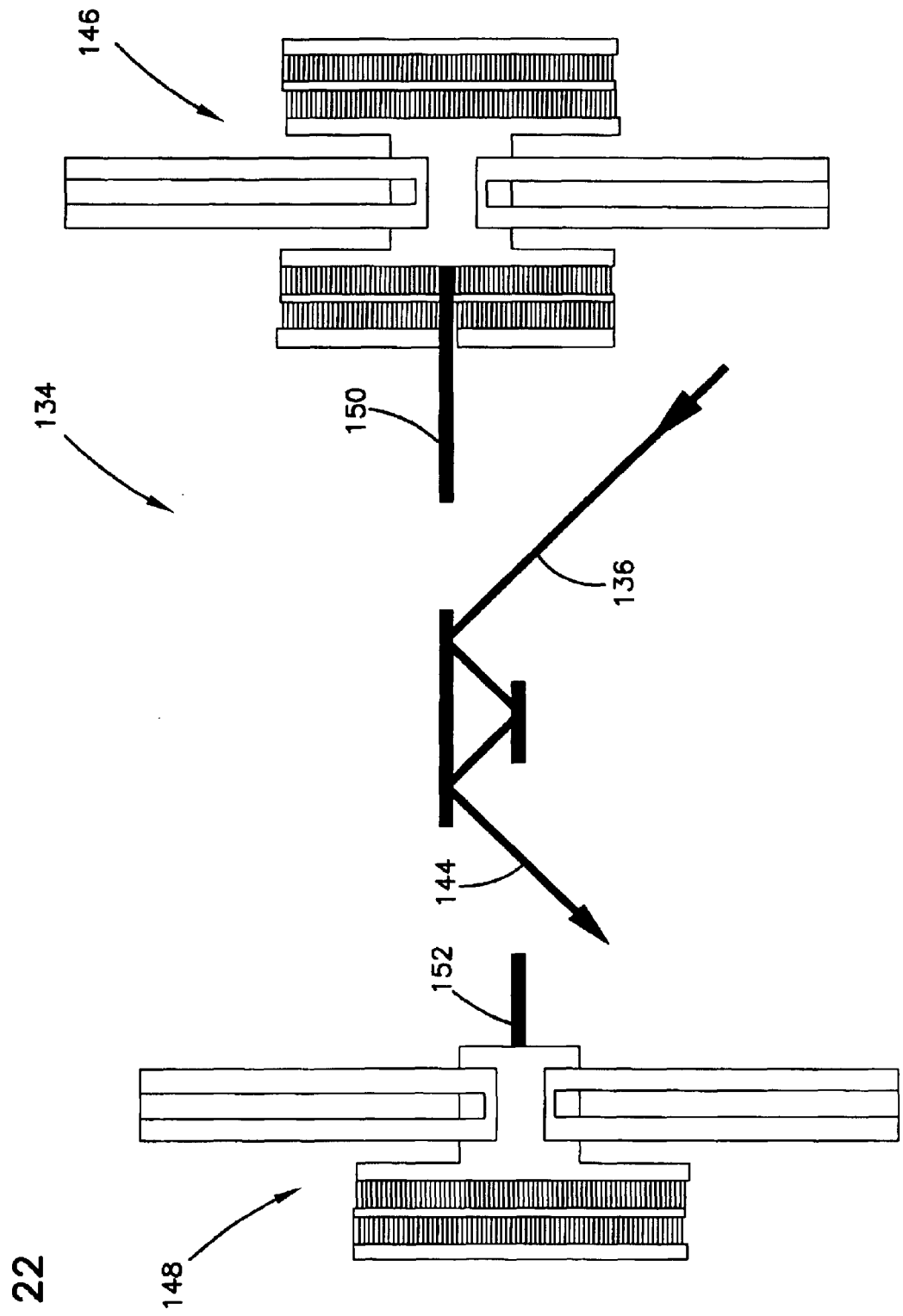
FIG. 22 is a schematic view of the optical switch of FIG. 18 being operated to switch the input optical beam, which is directed by the input waveguide, to a fourth output waveguide in accordance with the principles of the present invention.

In FIG. 22, the first mirror 150 is in its first extended position, and the second mirror 152 is in its extended position. The input optical beam which is directed by the input waveguide 136 is reflected by the first mirror 150, the second mirror 152, and the first mirror 150 again, then passes through the window 156 of the second mirror 152, and is output by the output waveguide 144.

Figure 23:
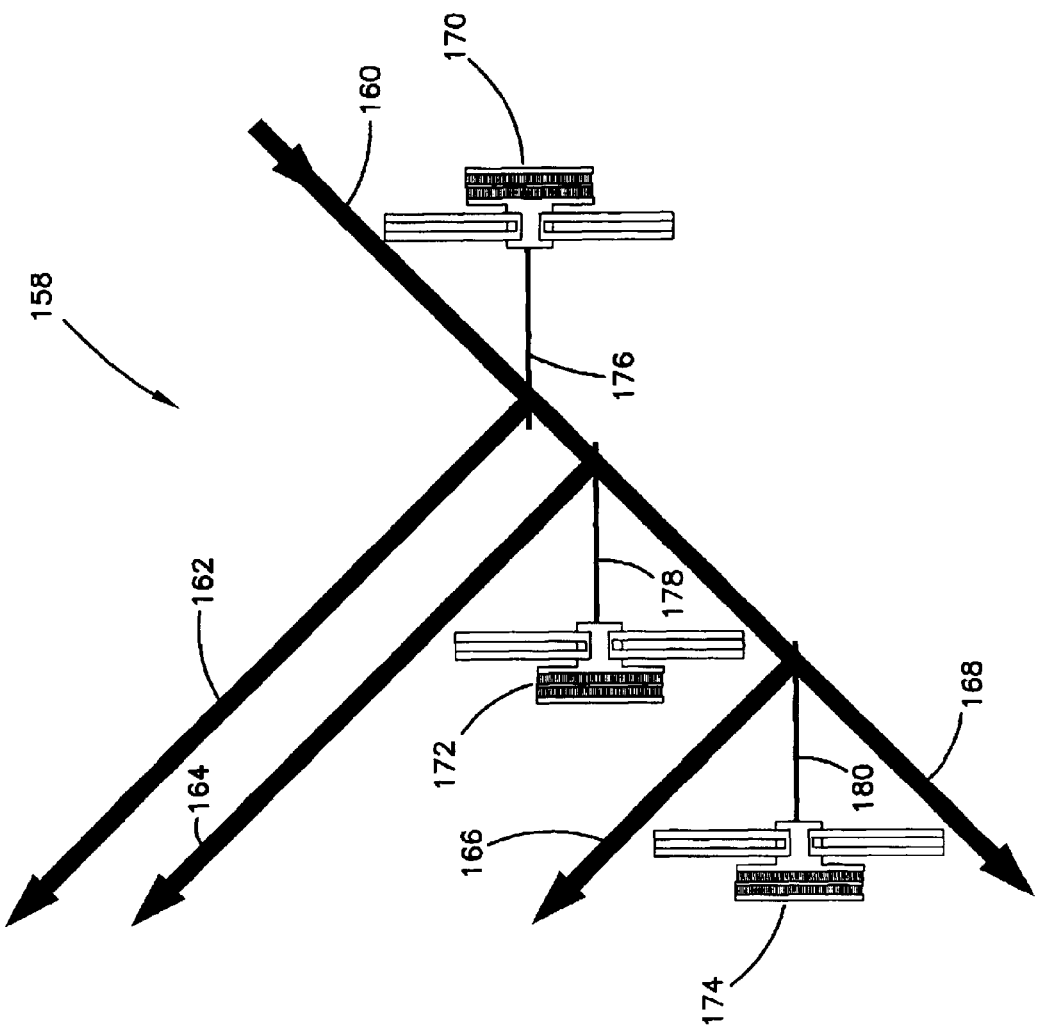
FIG. 23 is a schematic view of a sixth embodiment of an optical switch being operable to switch an input optical beam, which is directed by an input waveguide, to a plurality of output waveguides in accordance with the principles of the present invention.

FIG. 23 illustrates a sixth embodiment of an optical switch 158 being operable to switch an input optical beam directed by an input waveguide 160 to a plurality of output waveguides 162, 164, 166, and 168. The operations of actuators 170, 172, 174 in controlling of mirrors 176, 178, 180 are similar to the operations described in FIG. 11. As shown, the first actuator 170 moves the first mirror 176, attached thereto, into an extended position whereby the first mirror 176 reflects the input optical beam and directs the optical beam to the output waveguide 162, and into a retracted position whereby the input optical beam passes by the first mirror 176. The second actuator 172 moves the second mirror 178, attached thereto, into an extended position whereby the second mirror 178 reflects the optical beam from the first mirror 176 and directs the optical beam to the output waveguide 164, and into a retracted position whereby the optical beam from the first mirror 176 passes by the second mirror 178. The third actuator 174 moves the third mirror 180, attached thereto, into an extended position whereby the third mirror 180 reflects the optical beam from the second mirror 178 and directs the optical beam to the output waveguide 166, and into a retracted position whereby the optical beam from the second mirror 178 passes by the third mirror 180 and directs the optical beam to the output waveguide 168.

The mirrors 176, 178, 180 are similar to the mirrors described in the second embodiment. It is appreciated that other types of mirrors can be used within the scope of the present invention.

Figure 24:
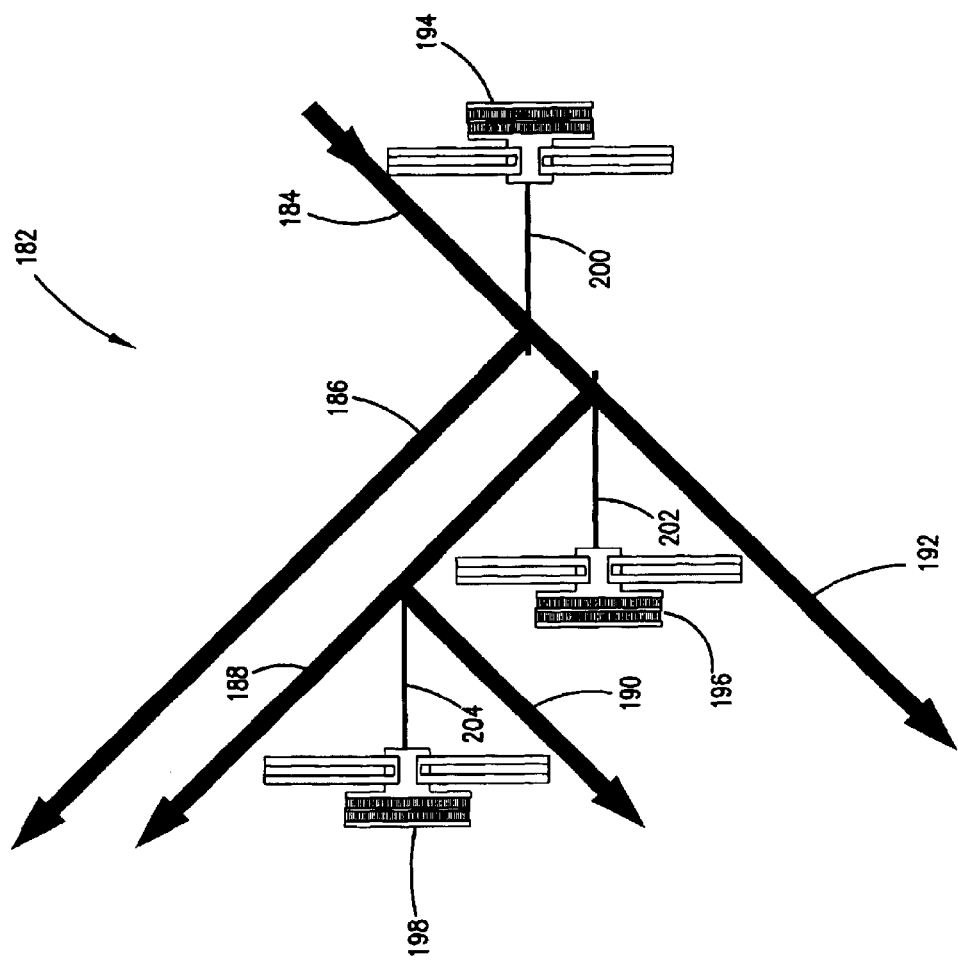
FIG. 24 is a schematic view of a seventh embodiment of an optical switch being operable to switch an input optical beam, which is directed by an input waveguide, to a plurality of output waveguides in accordance with the principles of the present invention.

FIG. 24 is a schematic view of a seventh embodiment of an optical switch 182 being operable to switch an input optical beam directed by an input waveguide 184 to a plurality of output waveguides 186, 188, 190, 192. The operations of actuators 194, 196, 198 in controlling of mirrors 200, 202, 204 are similar to the operations described in FIG. 12. As shown, the first actuator 194 moves the first mirror 200, attached thereto, into an extended position whereby the first mirror 200 reflects the input optical beam and directs the optical beam to the output waveguide 186, and into a pretracted position whereby the input optical beam passes by the first mirror 200. The second actuator 196 moves the second mirror 202, attached thereto, into an extended position whereby the second mirror 202 reflects the optical beam from the first mirror 200 and directs the optical beam towards the third mirror 204. If the third actuator 198 moves the third mirror 204 into its retracted position, the optical beam reflected from the second mirror 202 passes by the third mirror 204 and is output by the output waveguide 188. If the third actuator 198 moves the third mirror 204 into its extended position, the optical beam reflected from the second mirror 202 is reflected by the third mirror 204 and is output by the output waveguide 190. If the second actuator 196 moves the second mirror 202 into its retracted position, the optical beam reflected from the first mirror 200 is output by the output waveguide 192.

The mirrors 200, 202, 204 are similar to the mirrors described in the second embodiment. It is appreciated that other types of mirrors can be used within the scope of the present invention.

The above embodiments have shown the optical switches using optical waveguides. It is appreciated that other types of optical devices can be used to direct an optical beam into and out of a switching component. For example, collimator lenses in combination with optical fibers can be used to direct an optical beam into and out of a switching component.

It is appreciated that the present invention can be used for a variety of applications. For example, the present invention can be used for variable optical attenuators wherein a part of an optical beam is blocked.

Having described the present invention in a preferred embodiment, modifications and equivalents may occur to one skilled in the art. It is intended that such modifications and equivalents shall be included within the scope of the claims which are appended hereto.

What is claimed is:

1. An optical switch formed on a single substrate, the switch having an input and four outputs, comprising:
    a first actuator having a first mirror coupled thereto, the first actuator moving the first mirror into a first extended position, a second extended position, and a retracted position;
    a second actuator having a second mirror coupled thereto, the second actuator moving the second mirror into a first extended position, a second extended position, and a retracted position; and
    wherein the first mirror and the second mirror are disposed parallel to each other and offset a distance from each other, and by changing the position of at least one of the first and second mirrors, the output of the switch changes; and
    wherein the first mirror includes a notch that lets an optical beam pass through the first mirror without being reflected.

2. The optical switch of claim 1, wherein when the first mirror is in the first extended position and the second mirror is in the first extended position, an optical beam input to the switch is reflected by the first mirror and output from the switch at a first output.

3. The optical switch of claim 2, wherein when the first mirror is in the retracted position and the second mirror is in the first extended position, the optical beam input to the switch is reflected by the second mirror and output from the switch at a second output.

4. The optical switch of claim 3, wherein when the first mirror is in the retracted position and the second mirror is in the retracted position, the optical beam input to the switch passes through the switch without being reflected by the first and second mirrors and output from the switch at a third output.

5. The optical switch of claim 4, wherein when the first mirror is in the second extended position and the second mirror is in the second extended position, the optical beam input to the switch is reflected by the first and second mirrors and output from the switch at a fourth output.

6. The optical switch of claim 1, wherein the second mirror includes a notch capable of letting an optical beam pass through the second mirror without being reflected.

7. The optical switch of claim 1, wherein the first actuator is a double comb drive actuator capable of moving the first mirror into the first extended position, the second extended position, and the retracted position.

8. The optical switch of claim 7, wherein the second actuator is a double comb drive actuator capable of moving the second mirror into the first extended position, the second extended position, and the retracted position.

9. The optical switch of claim 1, wherein the first and second actuators are positioned to generally oppose one another.

10. A method of switching an optical switch, comprising the steps of:
providing first and second actuators having first and second mirrors coupled to the first mirror and second actuators, respectively, the first and second mirrors being disposed parallel to each other and offset a distance from each other in an intersection zone, and the first and second mirrors being capable of reflecting and/or passing through an optical beam input, depending on positions of the first and second mirrors, to any one of a plurality of optical output waveguides, wherein the first mirror includes a notch that lets an optical beam pass through the first mirror without being reflected;
directing the optical beam input to the intersection zone; and
controlling the first and second actuators to position the first and second mirrors to reflect and/or pass the optical beam input therethrough to any one of at least four different optical output waveguides.

11. The method of claim) 10, wherein the step of controlling the first and second actuators comprises a step of extending the first mirror in a first extended position and the second minor in a first extended position, the optical beam input to the intersection zone is reflected by the first minor and output from the intersection zone at a first of the plurality of output waveguides.

12. The method of claim 11, wherein the step of controlling the first and second actuators comprises a step of extending the first mirror in a retracted position and the second mirror in the first extended position, the optical beam input to the intersection zone is reflected by the second mirror and output from the intersection zone at a second of the plurality of output waveguides.

13. The method of claim 12, wherein the step of controlling the first and second actuators comprises a step of extending the first mirror in the retracted position and the second mirror in a retracted position, the optical beam input to the intersection zone passes through the intersection zone without being reflected by the first and second mirrors and output from the intersection zone at a third of the plurality of output waveguides.

14. The method of claim 13, wherein the step of controlling the first and second actuators comprises a step of extending the first mirror in a second extended position and the second mirror in a second extended position, the optical beam input to the intersection zone is reflected by the first and second minors and output from the intersection zone at a fourth of the plurality of output waveguides.

15. An optical switch, comprising:
a switching component formed in a substrate, comprising first and second selectively positionable mirrors, the first minor including a notch that lets an optical beam pass through the first mirror without being reflected;
an input waveguide formed in the substrate, the input waveguide having an input end and an output end, the output end of the input waveguide being disposed at the switching component wherein by changing positions of the first and second mirrors, an optical beam input which is input into the switching component by the input waveguide is selectively output to any one of a plurality of output waveguides, including:
a first output waveguide formed in the substrate, the first output waveguide having an input end and an output end, the input end of the first output waveguide being disposed at the switching component;
a second output waveguide formed in the substrate, the second output waveguide having an input end and an output end, the input end of the second output waveguide being disposed at the switching component;
a third output waveguide formed in the substrate, the third output waveguide having an input end and an output end, the input end of the third output waveguide being disposed at the switching component; and
a fourth output waveguide formed in the substrate, the fourth output waveguide having an input end and an output end, the input end of the fourth output waveguide being disposed at the switching component;
wherein each of the first, second, third, and fourth output waveguides is different from one another.

16. The optical switch of claim 15, wherein the switching component is configurable to determine a path through the switching component to be taken by the optical beam which is input to the switching component by the input waveguide.

17. The optical switch of claim 16, wherein the switching component comprises:
a first actuator having the first mirror coupled thereto, the first actuator moving the first mirror between at least one extended position and a retracted position;
a second actuator having the second mirror coupled thereto, the second actuator moving the second mirror between at least one extended position and a retracted position; and
wherein the first mirror and the second mirror are disposed parallel to each other and offset a distance from each other.

18. The optical switch of claim 15, wherein the switching component includes only two mirrors.

19. An 1×4 optical switch, comprising:
a switching component having a pair of mirrors, comprising a first mirror including a notch that lets an optical beam pass through the first mirror without being reflected;
an input waveguide; and
at least four different output waveguides, the switching component, the input waveguide and the output waveguides being formed in a single substrate;
wherein each of the mirrors of the pair of mirrors is selectively positionable relative to one another to output the input waveguide to any one of the at least four output waveguides.

20. The optical switch of claim 19, wherein the mirrors are disposed parallel to each other and offset a distance from each other.

21. An optical switch formed on a single substrate, the switch having an input and four outputs, comprising:
a first actuator having a first mirror coupled thereto, wherein the first actuator is a double comb driver actuator capable of moving the first mirror into a first extended position, a second extended position, and a retracted position;
a second actuator having a second mirror coupled thereto, the second actuator moving the second mirror into a first extended position, a second extended position, and a retracted position; and
wherein the first mirror and the second mirror are disposed parallel to each other and offset a distance from each other, and by changing the position of at least one of the first and second mirrors, the output of the switch changes.

22. The optical switch of claim 21, wherein the second actuator is a double comb drive actuator capable of moving the second mirror into the first extended position, the second extended position, and the retracted position.

23. An optical switch formed on a single substrate, the switch having an input and a plurality of outputs, comprising:
a first actuator having a first mirror coupled thereto, the first actuator moving the first mirror between at least one extended position and a retracted position;
a second actuator having a second mirror coupled thereto, the second actuator moving the second mirror between at least one extended position and a retracted position; and
wherein the first mirror and the second mirror are disposed parallel to each other and offset a distance from each other, and by changing the position of at least one of the first and second mirrors, the output of the switch changes;
wherein further when the first mirror is in a first extended position and the second mirror is in a first extended position, an optical beam input to the switch is reflected by the first mirror and outputs from the switch at a first of the plurality of outputs;
wherein further when the first mirror is in the retracted position and the second mirror is in the first extended position, the optical beam input to the switch is reflected by the second mirror and outputs from the switch at a second of plurality of outputs;
wherein further when the first mirror is in the retracted position and the second mirror is in the retracted position, the optical beam input to the switch passes through the switch without being reflected by the first and second mirrors and outputs from the switch at a third of the plurality of outputs; and
wherein further when the first mirror is in a second extended position and the second mirror is in a second extended position, the optical beam input to the switch is reflected by the first and second mirrors and outputs from the switch at a fourth of the plurality of outputs.

24. A method of switching an optical switch, comprising the steps of:
providing first and second actuators having first and second minors coupled to the first and second actuators, respectively, the first and second mirrors being disposed parallel to each other and offset a distance from each other in an intersection zone, and the first and second mirrors being capable of reflecting and/or passing through an optical beam, depending on positions of the first and second mirrors, to form a plurality of optical outputs;
directing the optical beam to the intersection zone; and
controlling the first and second actuators to position the first and second mirrors to reflect and/or pass the optical beam therethrough to form at least four optical outputs
wherein the step of controlling the first and second actuators comprises a step of extending the first mirror in a first extended position and the second mirror in a first extended position, and wherein the optical beam being input to the intersection zone is reflected by the first mirror and outputs from the intersection zone at a first of the plurality of outputs;
wherein further the step of controlling the first and second actuators comprises a step of extending the first mirror in a retracted position and the second mirror in the first extended position, and wherein the optical beam being input to the intersection zone is reflected by the second mirror and outputs from the intersection zone at a second of the plurality of outputs;
wherein further the step of controlling the first and second actuators comprises a step of extending the first mirror in the retracted position and the second mirror in a retracted position, and wherein the optical beam being input to the intersection zone passes through the intersection zone without being reflected by the first and second mirrors and outputs from the intersection zone at a third of the plurality of outputs; and
wherein further the step of controlling the first and second actuators comprises a step of extending the first mirror in a second extended position and the second mirror in a second extended position, and wherein the optical beam being input to the intersection zone is reflected by the first and second mirrors and outputs from the intersection zone at a fourth of the plurality of outputs.

25. An optical switch, comprising:
a switching component formed in a substrate, the switching component having only two mirrors, including a first mirror and a second mirror, the first mirror having a notch that lets an optical beam pass through the first mirror without being reflected;
an input waveguide formed in the substrate, the input waveguide having an input end and an output end, the output end of the input waveguide being disposed at the switching component;
a first output waveguide formed in the substrate, the first output waveguide having an input end and an output end, the input end of the first output waveguide being disposed at the switching component;

a second output waveguide formed in the substrate, the second output waveguide having an input end and an output end, the input end of the second output waveguide being disposed at the switching component;

a third output waveguide formed in the substrate, the third output waveguide having an input end and an output end, the input end of the third output waveguide being disposed at the switching component; and a fourth output waveguide formed in the substrate, the fourth output waveguide having an input end and an output end, the input end of the fourth output waveguide being disposed at the switching component.

* * * * *

UNITED STATES PATENT AND TRADEMARK OFFICE
CERTIFICATE OF CORRECTION

PATENT NO.    : 6,901,180 B2
DATED         : May 31, 2005
INVENTOR(S)   : Zhang et al.

It is certified that error appears in the above-identified patent and that said Letters Patent is hereby corrected as shown below:

Column 11,
Line 51, "method of claim )" should read -- method of claim --.

Column 12,
Line 17, "first minor including" should read -- first mirror including --.

Column 14,
Line 12, "second minors coupled" should read -- second mirrors coupled --.

Signed and Sealed this

Eleventh Day of October , 2005

JON W. DUDAS
*Director of the United States Patent and Trademark Office*